(12) United States Patent
Kim et al.

(10) Patent No.: US 9,509,383 B2
(45) Date of Patent: Nov. 29, 2016

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Hanjun Park, Seoul (KR); Kijun Kim, Seoul (KR); Hyunho Lee, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/784,422

(22) PCT Filed: Apr. 29, 2014

(86) PCT No.: PCT/KR2014/003795
§ 371 (c)(1),
(2) Date: Oct. 14, 2015

(87) PCT Pub. No.: WO2014/178615
PCT Pub. Date: Nov. 6, 2014

(65) Prior Publication Data
US 2016/0072567 A1     Mar. 10, 2016

Related U.S. Application Data

(60) Provisional application No. 61/817,270, filed on Apr. 29, 2013, provisional application No. 61/821,192, filed on May 8, 2013, provisional application No. 61/823,926, filed on May 16, 2013, provisional application No. 61/831,117, filed on Jun. 4, 2013.

(51) Int. Cl.
*H03D 1/04* (2006.01)
*H04B 7/00* (2006.01)
(Continued)

(52) U.S. Cl.
CPC .......... *H04B 7/0486* (2013.01); *H04B 7/0478* (2013.01); *H04B 7/063* (2013.01); *H04B 7/0626* (2013.01); *H04B 7/0632* (2013.01); *H04B 7/0639* (2013.01)

(58) Field of Classification Search
USPC ............................... 375/219, 220, 221, 222, 375/240.26–240.27, 267, 271, 284, 285, 375/295, 302, 309, 316, 322, 324, 346, 3, 375/47, 349, 358, 362, 371; 370/310, 319, 370/342, 337, 344, 347, 360, 208
See application file for complete search history.

(56) References Cited

U.S. PATENT DOCUMENTS 8,798,185 B2 *   8/2014   Chen ...................... H04B 7/063
                                                                  375/267
9,307,476 B2 *   4/2016   Peng ..................... H04W 36/32
(Continued)

FOREIGN PATENT DOCUMENTS

FR   EP 2775563 A1 *  9/2014 ............. H01Q 1/246
KR   10-2010-0035086     4/2010
(Continued)

OTHER PUBLICATIONS

PCT International Application No. PCT/KR2014/003795, Written Opinion of the International Searching Authority dated Aug. 6, 2014, 19 pages.
(Continued)

*Primary Examiner* — Linda Wong
(74) *Attorney, Agent, or Firm* — Lee, Hong, Degerman, Kang & Waimey

(57) ABSTRACT

The present invention relates to a wireless communication system. According to one embodiment of the present invention, a method for transmitting, by a terminal, channel state information (CSI) in a wireless communication system comprises the steps of: subsampling a code book for four antenna ports, including sixteen precoding matrixes; and feeding back the CSI on the basis of the subsampled code book, wherein the CSI includes at least one of a rank indicator (RI), a precoding matrix indicator (PMI) and a channel quality indicator (CQI), and if the RI is 3, the subsampled code book can be determined so as to minimize a chordal distance between subsampled code words.

10 Claims, 15 Drawing Sheets

(51) Int. Cl.
*H04B 7/204* (2006.01)
*H04B 7/04* (2006.01)
*H04B 7/06* (2006.01)

(56) References Cited

U.S. PATENT DOCUMENTS

| | | | | |
|---|---|---|---|---|
| 2011/0249713 | A1* | 10/2011 | Hammarwall | H04B 7/0634 375/220 |
| 2013/0114763 | A1* | 5/2013 | Park | H04B 7/0413 375/296 |
| 2013/0129014 | A1* | 5/2013 | Kim | H04B 7/0456 375/295 |
| 2013/0182787 | A1* | 7/2013 | Kakishima | H04B 7/0652 375/267 |
| 2014/0079147 | A1* | 3/2014 | Nammi | H04B 7/0619 375/267 |
| 2014/0086285 | A1* | 3/2014 | Yang | H04B 7/0691 375/219 |
| 2014/0086352 | A1* | 3/2014 | Ko | H04B 7/0486 375/267 |
| 2014/0247743 | A1* | 9/2014 | Seo | H04W 24/10 370/252 |
| 2014/0348260 | A1* | 11/2014 | Lorca Hernando | H04B 7/0617 375/295 |
| 2014/0369436 | A1* | 12/2014 | Zhang | H04L 5/0091 375/267 |

FOREIGN PATENT DOCUMENTS

| | | |
|---|---|---|
| KR | 10-2011-0138742 | 12/2011 |
| KR | 10-2012-0031894 | 4/2012 |
| KR | 10-2012-0049095 | 5/2012 |
| KR | 10-2012-0089635 | 8/2012 |

OTHER PUBLICATIONS

PCT International Application No. PCT/KR2014/003795, Written Opinion of the International Searching Authority dated Aug. 6, 2014, 14 pages.

* cited by examiner (a) Control - Plane Protocol Stack (b) User - Plane Protocol Stack

| CQI reporting mode | | PMI feedback type | |
|---|---|---|---|
| | | No PMI | Single PMI |
| PUCCH CQI feedback type | Wideband (wideband CQI) | Mode 1-0 | Mode1-1 |
| | UE-selected (subband CQI) | Mode 2-0 | Mode 2-1 |

(a)

(b)

Report 1    Report 2 w/ PTI=0    Report 3 w/ PTI=0

Report 2 w/ PTI=1    Report 3 w/ PTI=1

METHOD AND APPARATUS FOR TRANSMITTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/003795, filed on Apr. 29, 2014, which claims the benefit of U.S. Provisional Application No. 61/817,270, filed on Apr. 29, 2013, 61/821,192, filed on May 8, 2013, 61/823,926, filed on May 16, 2013 and 61/831,117, filed on Jun. 4, 2013, the contents of which are all hereby incorporated by reference herein in their entirety.

TECHNICAL FIELD

The present invention relates to a wireless communication system, and more particularly to a method and apparatus for transmitting channel state information (CSI) using subsampling of a codebook in a wireless communication system.

BACKGROUND ART

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

Multiple Input Multiple Output (MIMO) technology will hereinafter be described in detail. In brief, MIMO is an abbreviation for Multiple Input Multiple Output. MIMO technology uses multiple transmit (Tx) antennas and multiple receive (Rx) antennas to improve the efficiency of transmit/receive (Tx/Rx) of data, whereas the conventional art generally uses a single transmit (Tx) antenna and a single receive (Rx) antenna. In other words, MIMO technology allows a transmitter and a receiver to use multiple antennas so as to increase capacity or improve performance. If necessary, the MIMO technology may also be called multi-antenna technology.

In order to support MIMO transmission, the precoding matrix for properly distributing transmit (Tx) information to respective antennas according to a channel state or the like may be used.

DISCLOSURE

Technical Problem

An object of the present invention is to provide a method and apparatus for transmitting channel state information (CSI) in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing channel state information (CSI) by a user equipment (UE) in a wireless communication system including: subsampling a codebook for 4-antenna ports including 16 precoding matrices; and feeding back the channel state information (CSI) on the basis of the subsampled codebook, wherein the channel state information (CSI) includes at least one of a rank indicator (RI), a precoding matrix indicator (PMI), and a channel quality indicator (CQI), and if the rank indicator (RI) is set to 3, the subsampled codebook is determined in a manner that a chordal distance between subsampled codewords is minimized.

In accordance with another aspect of the present invention, a user equipment (UE) for transmitting channel state information (CSI) in a wireless communication system includes: a radio frequency (RF) unit; and a processor, wherein the processor subsamples a codebook for 4-antenna ports including 16 precoding matrices, and feeds back the channel state information (CSI) on the basis of the subsampled codebook, wherein the channel state information (CSI) includes at least one of a rank indicator (RI), a precoding matrix indicator (PMI), and a channel quality indicator (CQI), and if the rank indicator (RI) is set to 3, the subsampled codebook is determined in a manner that a chordal distance between subsampled codewords is minimized.

The following items can be commonly applied to the embodiments of the present invention.

The subsampled codebook may be determined in a manner that the chordal distance between the subsampled codewords is set to 1.

The subsampled codebook may include a first precoding matrix, a third precoding matrix, a $9^{th}$ precoding matrix, and a 11st precoding matrix from among the 16 precoding matrices.

The subsampled codebook may include a $13^{rd}$ precoding matrix, a $14^{th}$ precoding matrix, a $15^{th}$ precoding matrix, and a $16^{th}$ precoding matrix from among the 16 precoding matrices.

The subsampled codebook may include a second precoding matrix, a fourth precoding matrix, a $10^{th}$ precoding matrix, and a $12^{th}$ precoding matrix from among the 16 precoding matrices.

The subsampled codebook may include only real numbers.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention may provide a method and apparatus for efficiently transmitting channel state information (CSI) using subsampling of a codebook in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
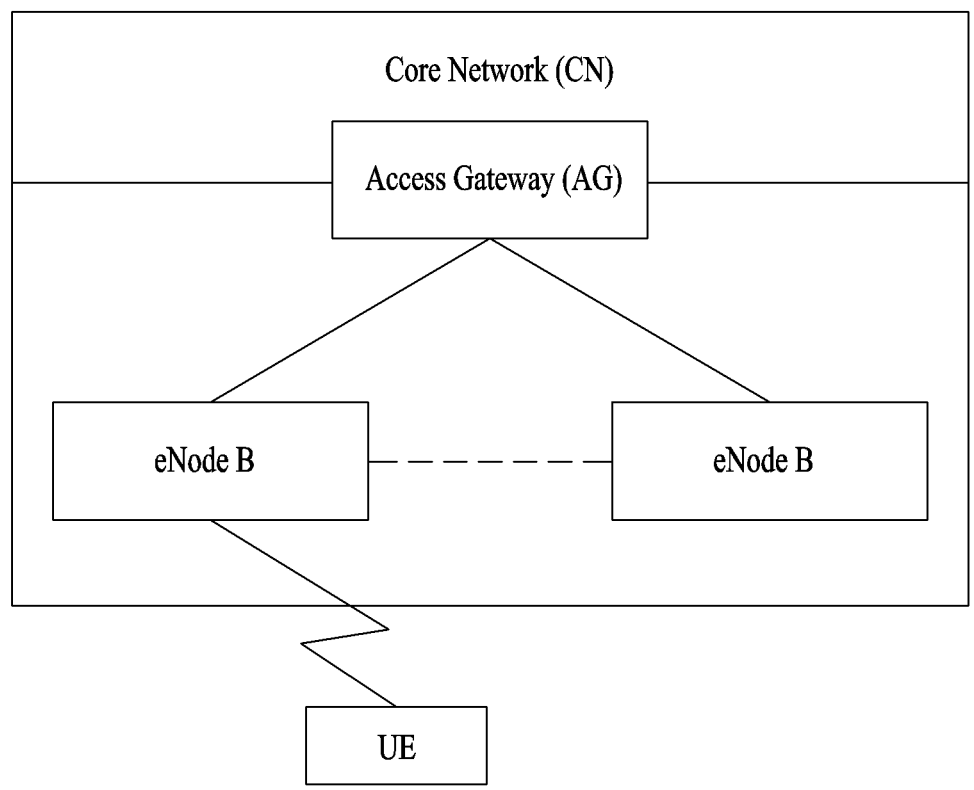
FIG. 1 is a diagram schematically showing a network structure of an evolved universal mobile telecommunications system (E-UMTS) as an exemplary radio communication system.
Figure 2:
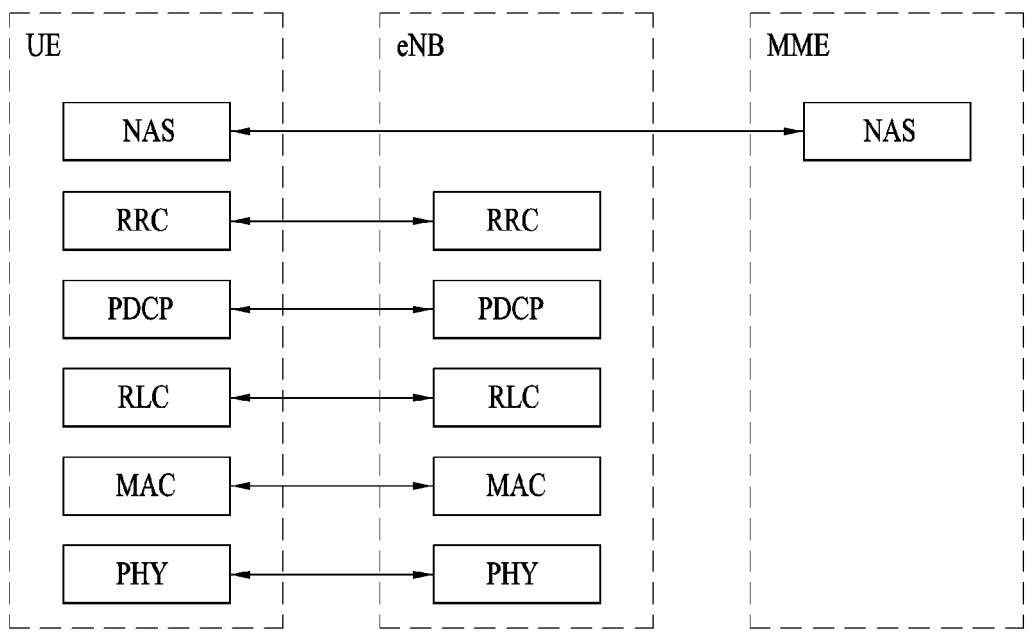
FIG. 2 is a diagram illustrating a control plane and a user plane of a radio interface protocol between a UE and an evolved universal terrestrial radio access network (E-UTRAN) based on a 3rd generation partnership project (3GPP) radio access network standard.
Figure 2:
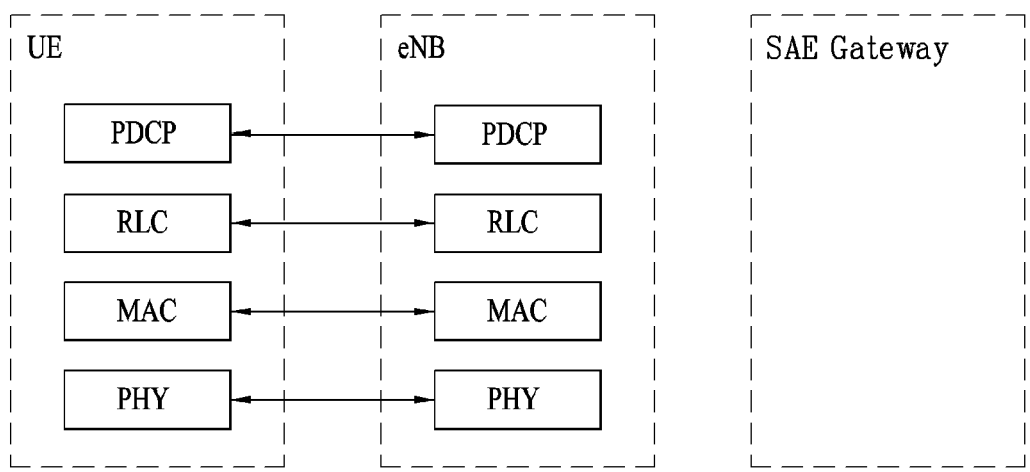

FIG. 2 is a diagram illustrating a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
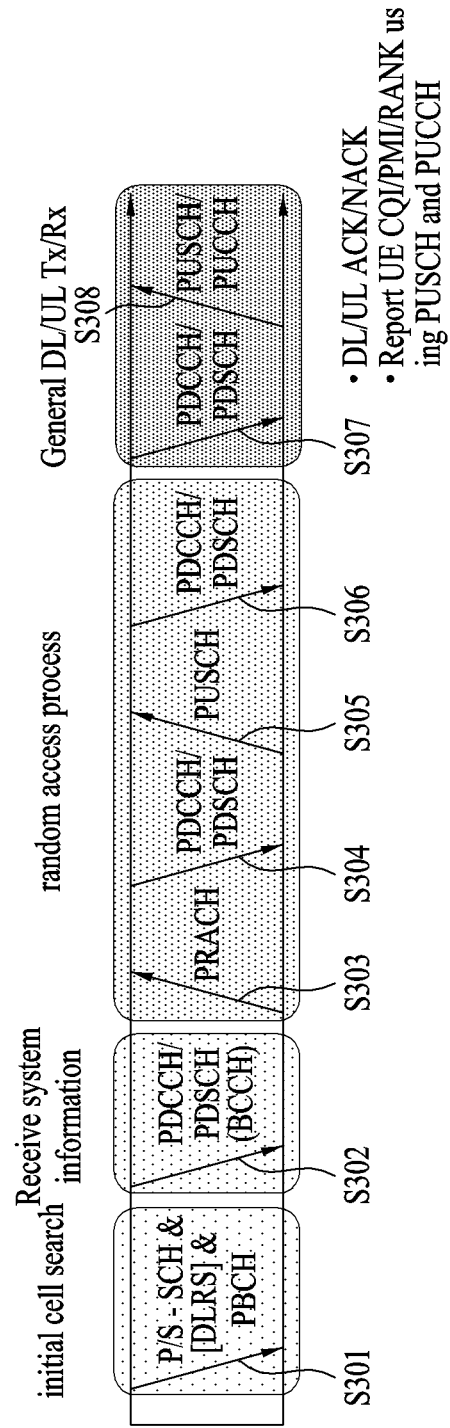
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). To this end, the UE may receive a Primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. To this end, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) through the PDCCH. Here, the DCI contains control information such as resource allocation information about a UE and has different formats according to according to different usages of DCI.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
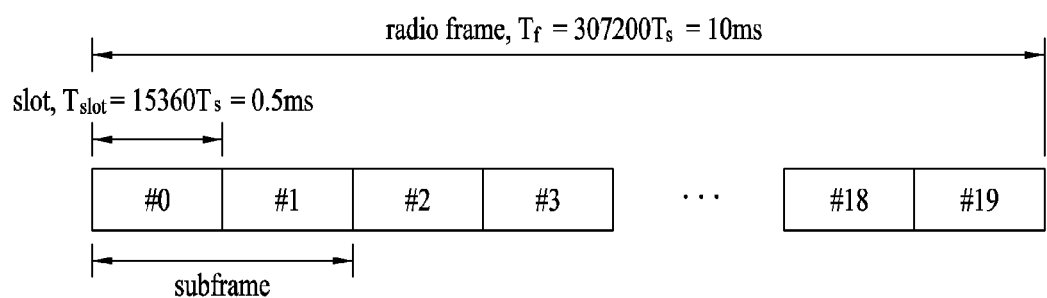
FIG. 4 is a diagram illustrating an example of the structure of a radio frame used in a long term evolution (LTE) system.

FIG. 4 is a diagram illustrating an example of the structure of a radio frame used in an LTE system.

Referring to FIG. 4, a radio frame has a length of 10 ms (327200×Ts) and includes ten subframes having an equal size. Each subframe has a length of 1 ms and includes two slots each having a length of 0.5 ms (15360×Ts). Here, Ts denotes a sampling time, which is represented as $Tx=1/(15 kHz \times 2048)=3.2552 \times 10^{-8}$ (approximately 33 ns). A slot includes a plurality of orthogonal frequency division multiplexing (OFDM) symbols in the time domain and a plurality of resource blocks in the frequency domain. In the LTE system, one resource block includes 12 subcarriers×7(6) OFDM symbols. A unit time for transmitting data, transmission time interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 5:
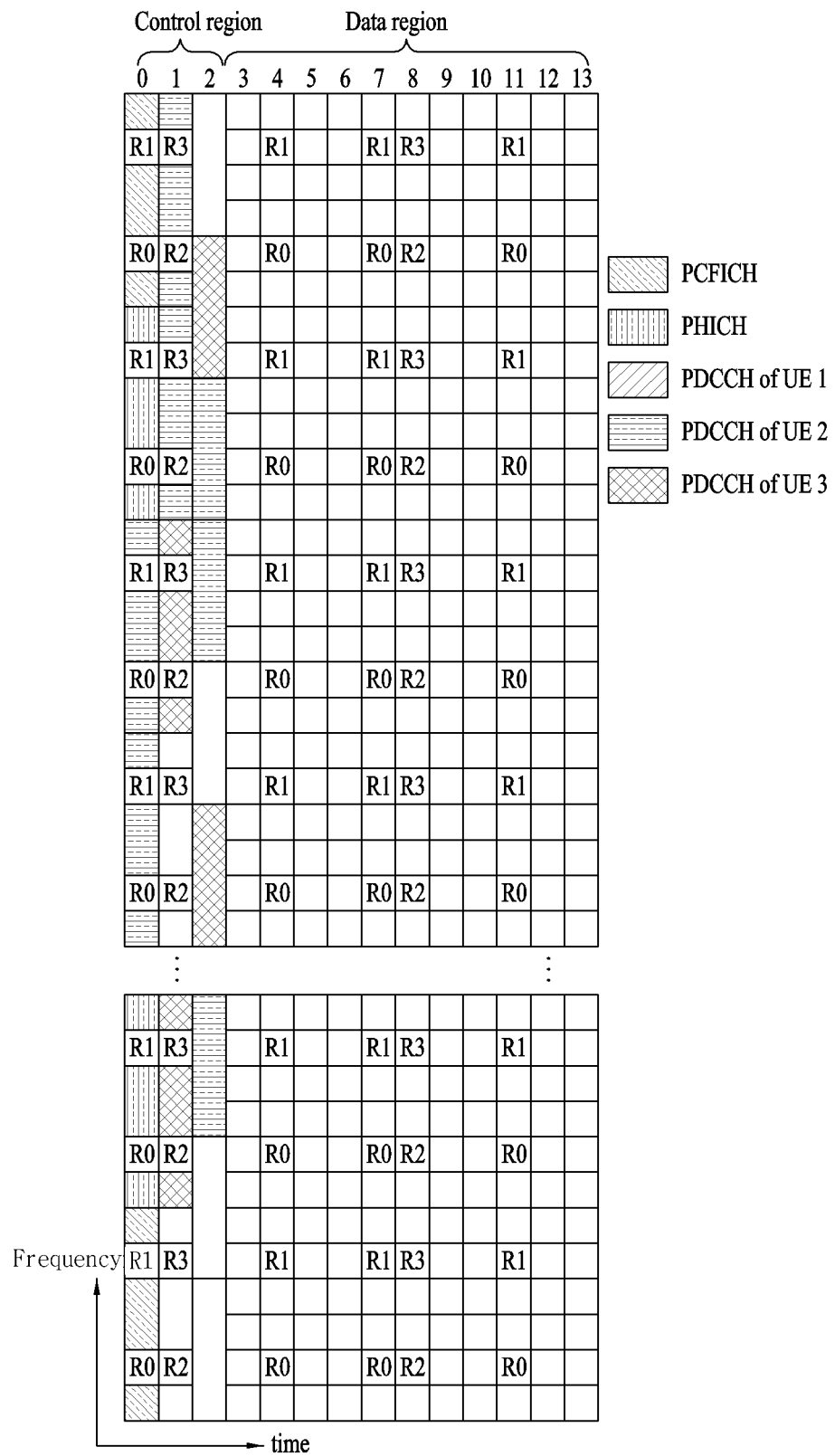
FIG. 5 is a diagram illustrating a control channel included in a control region of a subframe in a downlink radio frame.

FIG. 5 is a diagram illustrating a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a physical control format indicator channel (PCFICH), physical hybrid-arq indicator channel (PHICH), physical downlink control channel (PDCCH), etc.

The physical control format indicator channel (PCFICH) informs the UE of the number of OFDM symbols used for the PDCCH per subframe. The PCFICH is located at a first OFDM symbol and is set prior to the PHICH and the PDCCH. The PCFICH includes four resource element groups (REGs) and the REGs are dispersed in the control region based on a cell identity (ID). One REG includes four resource elements (REs). An RE indicates a minimum physical resource defined as one subcarrier×one OFDM symbol. The PCFICH has a value of 1 to 3 or 2 to 4 and is modulated using a quadrature phase shift keying (QPSK) scheme.

The physical Hybrid-ARQ indicator channel (PHICH) is used to transmit HARQ ACK/NACK for uplink transmission. That is, the PHICH refers to a channel in which DL ACK/NACK information for UL HARQ is transmitted. The PHICH includes one REG and is scrambled on a cell-specific basis. ACK/NACK is indicated by one bit and is modulated using binary phase shift keying (BPSK). The modulated ACK/NACK is spread with a spreading factor (SF) of 2 or 4. A plurality of PHICHs mapped to the same resource constitutes a PHICH group. The number of multiplexed PHICHs in the PHICH group is determined according to the number of SFs. The PHICH (group) is repeated through times in order to acquire diversity gain in the frequency domain and/or time domain.

The physical downlink control channel (PDCCH) is allocated to the first n OFDM symbols of a subframe. Here, n is an integer of 1 or more and is indicated by a PCFICH. The PDCCH includes one or more control channel elements (CCEs). The PDCCH informs each UE or a UE group of information associated with resource allocation of a paging channel (PCH) and a downlink-shared channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
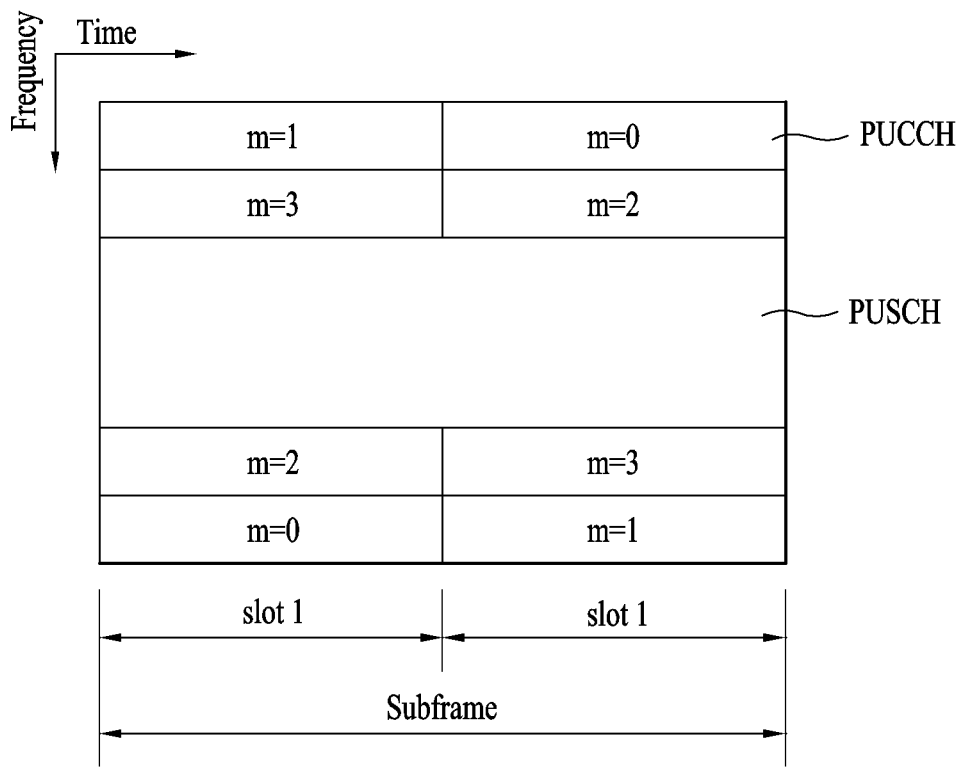
FIG. 6 is a diagram illustrating an uplink subframe structure used in an LTE system.

FIG. 6 is a diagram illustrating an uplink subframe structure used in an LTE system.

Referring to FIG. 6, a UL subframe may be divided into a region to which physical uplink control channel (PUCCH) for carrying control information is allocated and a region to which physical uplink shared channel (PUSCH) for carrying user data is allocated. The middle of the subframe is allocated to the PUSCH, while both sides of the data region in the frequency domain are allocated to the PUCCH. Control information transmitted on the PUCCH may include a Hybrid Automatic Repeat request acknowledgement/negative acknowledgement (HARQ ARCK/NACK), a Channel Quality Indicator (CQI) representing a downlink channel state, a rank indicator (RI) for multiple input multiple output (MIMO), a scheduling request (SR) requesting uplink resource allocation. A PUCCH for one UE uses one resource block that occupies different frequencies in slots in a subframe. That is, two resource blocks allocated to the PUCCH is frequency hopped at a slot boundary. In particular, PUCCHs with m=0, m=1, and m=2 are allocated to a subframe in FIG. 6.

Multiple Input Multiple Output (MIMO) System

Now a description will be given of a Multiple Input Multiple Output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
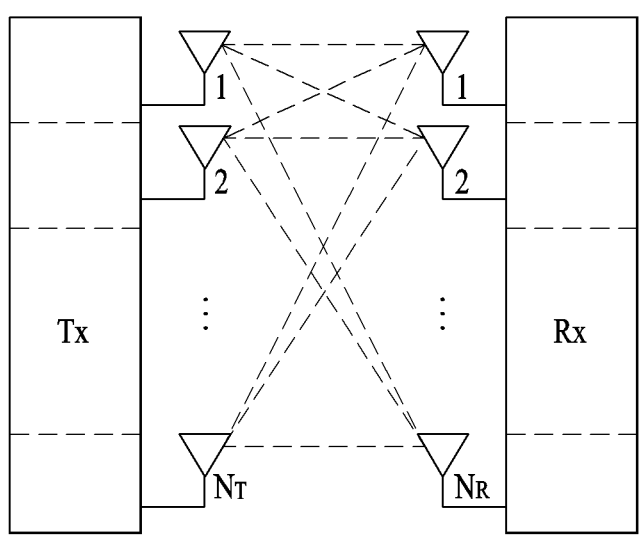
FIG. 7 illustrates the configuration of a typical multiple input multiple output (MIMO) communication system.

FIG. 7 illustrates the configuration of a typical MIMO communication system. Referring to FIG. 7, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the vector shown in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\bar{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\bar{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below. Herein, $w_{ij}$ denotes a weight between a $j^{th}$ piece of information and an $i^{th}$ Tx antenna and W is referred to as a weight matrix or a precoding matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\cap \text{ of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Channel State Information (CSI) Feedback

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a reference signal (RS) to the UE and may command the UE to feed back measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of Multi-User MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as Equation 8 below may be used for hierarchical codebook transformation that configures one final PMI with W1 and W2.

$$W = \text{norm}(W1 W2) \quad \text{[Equation 8]}$$

In Equation 8 above, W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as Equation 9 below.

$$W1(i) = \begin{bmatrix} X_i & 0 \\ 0 & X_i \end{bmatrix},$$ [Equation 9]

where $X_i$ is Nt/2 by M matrix.

$$W2(j) = \begin{bmatrix} \overbrace{e_M^k \quad e_M^l \quad e_M^m}^{r\ columns} \\ \ldots \\ \alpha_j e_M^k \quad \beta_j e_M^l \quad \gamma_j e_M^m \end{bmatrix}$$

(if rank=r), where $1 \leq k, l, m \leq M$ and k, l, m are integer.

Here, Nt is the number of Tx antennas and M is the number of columns of a matrix Xi, which means that the matrix Xi has total M candidate column vectors. $e_M^k$, $e_M^l$, and are column vectors that have elements of 0 except for only $k_{th}$, $l_{th}$, and $m_{th}$ elements that are 1 among M elements and are $k_{th}$, $l_{th}$, and $m_{th}$ column vectors of Xi. $\alpha_j$, $\beta_j$, and $\gamma_j$ are complex values and indicate that phase rotation is applied to the $k_{th}$, $l_{th}$, and $m_{th}$ column vectors of the matrix in order to choose these column vectors, respectively. i is an integer equal to or greater than 0 and is a PMI index indicating W1. j is an integer equal to or greater than 0 and is a PMI index indicating W2.

In Equation 9 above, the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as Equation 10 below.

$$W1(i) * W2(j) = \begin{bmatrix} X_i(k) \\ \alpha_j X_i(k) \end{bmatrix}$$ [Equation 10]

In [Equation 10], a codeword is expressed as an $N_T \times 1$ vector where $N_T$ is the number of Tx antennas and the codeword is composed of an upper vector $X_i(k)$ and a lower vector, $\alpha_j X_i(k)$, representing the correlation characteristics of the horizontal and vertical antenna groups, respectively. Preferably, $x_i(k)$ (is expressed as a vector having the linear phase increment property, reflecting the correlation characteristics between antennas in each antenna group. For example, a Discrete Fourier Transform (DFT) matrix may be used for $X_i(k)$.

As described above, CSI in an LTE system includes, but is not limited to, CQI, PMI, and RI. Some or all of CQI, PMI, and RI may be transmitted according to a transmission mode of a UE. A case in which CSI is periodically transmitted is referred to as periodic reporting and a case in which CSI is transmitted according to request of a BS is referred to as aperiodic reporting. In case of aperiodic reporting, a request bit contained in UL scheduling information from the BS is transmitted to the UE. Then, the UE transmits CSI obtained in consideration of a transmission mode of the UE to the BS via a UL data channel (PUSCH). In case of periodic reporting, periods, offset for a corresponding period, etc. are signaled in units of subframes via an upper layer signal for each respective UE in a semi-static manner. Each UE transmits CSI obtained in consideration of a transmission mode of the UE to the BS via a UL control channel (PUCCH) according to a predetermined period. When UL data and CSI are simultaneously present in a subframe for transmitting CSI, the CSI is transmitted through a UL data channel (PUSCH) together with the data. The BS transmits transmission timing information appropriate for each respective UE to the UE in consideration of a channel state of each UE, a distribution state of UEs in a cell, etc. The transmission timing information includes a period, offset, etc. for transmission of CSI and may be transmitted to each UE through an RRC message.

FIGS. 8 to 11 illustrate periodic reporting of CSI in LTE.

Figures 8, 9:
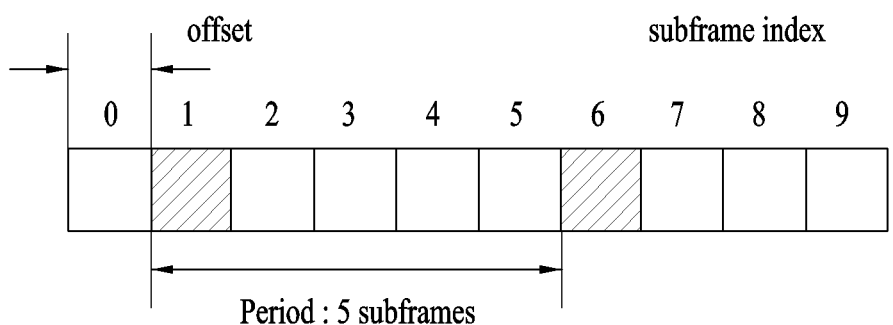
FIGS. 8 to 11 illustrate periodic reporting of channel state information (CSI).

Referring to FIG. 8, an LTE system has four CQI reporting modes. In detail, the CQI reporting mode is classified into WB CQI and SB CQI according to a CQI feedback type and is classified into no PMI and single PMI according to whether PMI is transmitted. Each UE receives information formed by combining a period and offset via RRC signaling in order to periodically report CQI.

FIG. 9 illustrates an example in which a UE transmits CSI when information indicating {period '5' and offset '1'} is signaled to the UE. Referring to FIG. 9, upon receiving the information indicating {period '5' and offset '1'}, the UE transmits CSI in units of 5 subframes with an offset of one subframe in a direction in which a subframe index increases from a $0_{th}$ subframe. CSI. CSI is basically transmitted via a PUCCH. However, when PUSCH for transmission is present at the same time, CSI is transmitted together with data via PUSCH. A subframe index is formed by combining a system frame number (or a radio frame index) (nf) and a slot index (ns, 0 to 19). Since a subframe includes 2 slots, a subframe index may be defined according to 10*nf+floor (ns/2). floor( ) indicates a rounddown function.

There are a type for transmitting only WB CQI and a type for both WB CQI and SB CQI. In case of the type for transmitting only WB CQI, CQI information about an entire band in a subframe corresponding to every CQI transmission period is transmitted. As illustrated in FIG. 8, when PMI needs to be also transmitted according to a PMI feedback type, PMI information is transmitted together with CQI information. In case of the type for transmitting both WB CQI and SB CQI, WB CQI and SB CQI are alternately transmitted.

Figure 10:
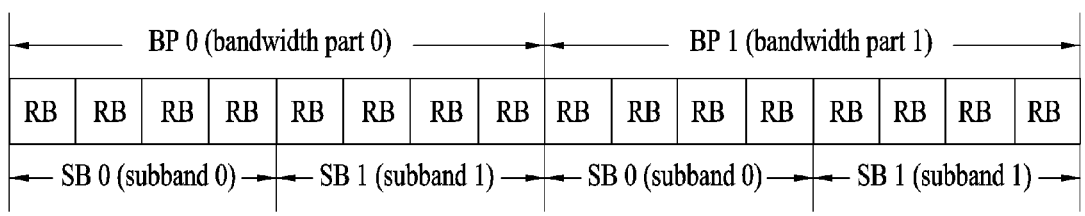
Figure 11:
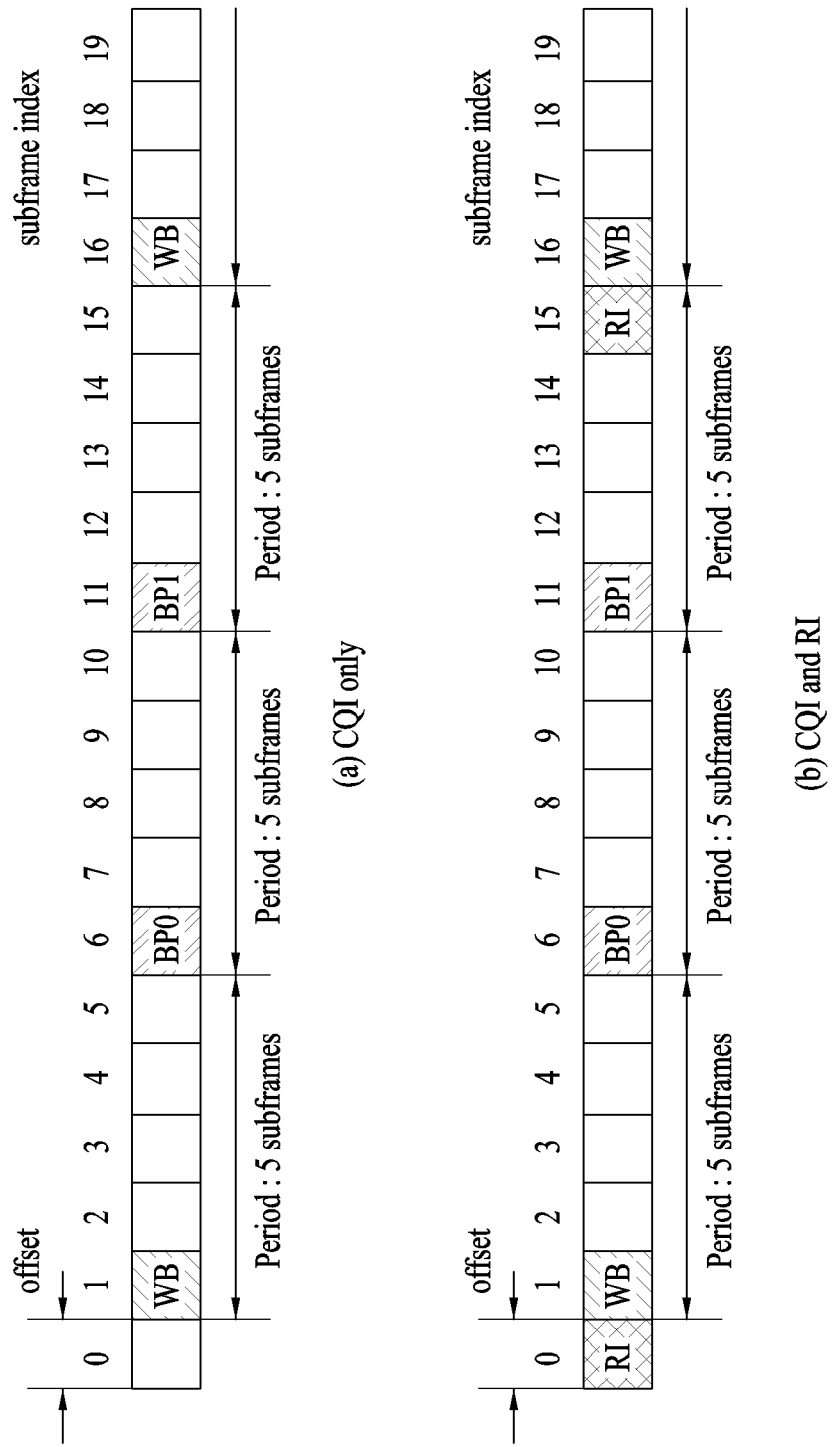

FIG. 10 is a diagram illustrating an exemplary system having a system band with 16 RBs. In this case, it is assumed that the system band includes two bandwidth parts (BPs) BP0 and BP1 which each include two subbands SB0 and SB1 which each include four RBs. This assumption is purely exemplary for explanation. The number BPs and the size of each SB may vary according to the size of the system band.

In addition, the number of SBs included in each BP may vary according to the number of RBs, the number of BPs, and the size of SB.

In case of the type for transmission both WB CQI and SB CQI, WB CQI is transmitted in a first CQI transmission subframe, and CQI about an SB having a better channel state from SB0 and SB1, belonging to BP0, and an index (e.g., a subband selection indicator (SSI) corresponding to the corresponding SB are transmitted in a next CQI transmission subframe. Then, CQI about an SB having a better channel state from SB0 and SB1, belonging to BP1, and an index corresponding to the corresponding SB is transmitted in a next transmission subframe. Likewise, after WB CQI is transmitted, CQI information about BPs is sequentially transmitted. CQI information about each BP between two WB CQIs may be sequentially transmitted once to four times. For example, when CQI information about each BP between two WB CQIs is sequentially transmitted once, CQI information may be transmitted in an order of WB CQI⇒BP0 CQI⇒BP1 CQI⇒WB CQI. In addition, when CQI information about each BP between two WB CQIs is sequentially transmitted four times, CQI information may be transmitted in an order of WB CQI⇒BP0 CQI⇒BP1 CQI⇒BP0 CQI⇒BP1 CQI⇒BP0 CQI⇒BP1 CQI⇒BP0 CQI⇒BP1 CQI⇒WB CQI. Information about a number of times that each BP CQI is sequentially transmitted is signaled in an upper layer (e.g., an RRC layer).

FIG. 11(a) is a diagram illustrating an example in which a UE transmits both WB CQI and SB CQI when information indicating {period '5' and offset '1'} is signaled to the UE. Referring to FIG. 11(a), CQI may be transmitted in only a subframe corresponding to signaled period and offset irrespective a type of CQI. FIG. 11(b) illustrates a case in which RI is additionally transmitted in a case of FIG. 11(a). RI may be signaled from an upper layer (e.g., an RRC layer) via a combination of a multiple of WB CQI transmission period and offset in the corresponding transmission period. Offset of RI is signaled as a relative value based on offset of CQI. For example, when the offset of CQI is '1' and the offset of RI is '0', RI may have the same offset as CQI. The offset of RI is defined as 0 and a negative value. In detail, FIG. 11(b) assumes a case in which a RI transmission period is one time of a WB CQI transmission period and the offset of RI is '−1' in the same environment as in FIG. 11(a). Since the RI transmission period is one time of the WB CQI transmission period, transmission periods of CSI are actually the same. Since the offset of RI is '−1', RI is transmitted based on '−1' (that is, subframe #0) with respect to offset '1' of CQI in FIG. 11(a). When the offset of RI is '0', transmission subframes of WB CQI and RI overlap each other. In this case, WB CQI is dropped and RI is transmitted.

Figure 12:
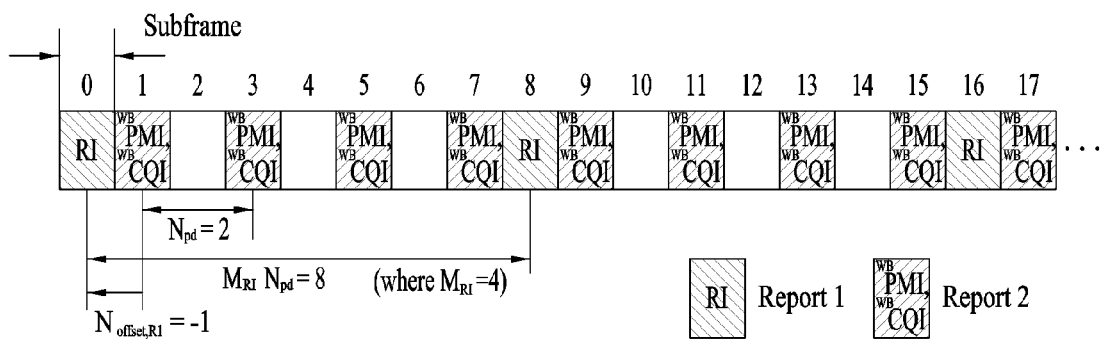
FIGS. 12 and 13 illustrate an exemplary process for periodically reporting CSI when a non-hierarchical codebook is used.

FIG. 12 is a diagram illustrating CSI feedback in case of Mode 1-1 of FIG. 8.

Referring to FIG. 12, the CSI feedback is composed of transmission of two types of report contents, Report 1 and Report 2. In detail, RI is transmitted in Report 1 and WB PMI and WB CQI are transmitted in Report 2. Report 2 is transmitted in a subframe with a subframe index satisfying (10*nf+floor(ns/2)−N offset, CQI)mod(Npd)=0. N offset, CQI corresponds to an offset value for transmission of PMI/CQI illustrated in FIG. 9. FIG. 12 illustrates a case of N offset, CQI=1. Npd 5 is a subframe interval between adjacent Reports 2. FIG. 12 illustrates a case of Npd=2. Report 1 is transmitted in a subframe with a subframe index satisfying (10*nf+floor(ns/2)−N offset, CQI−N offset, RI)mod(MRI*Npd)=0. $M_{RI}$ is determined via upper layer signaling. In addition, N offset, RI corresponds to a relative offset value for transmission of RI illustrated in FIG. 11. FIG. 12 illustrates a case of $M_{RI}$=4 and N offset, RI=−1.

Figure 13:
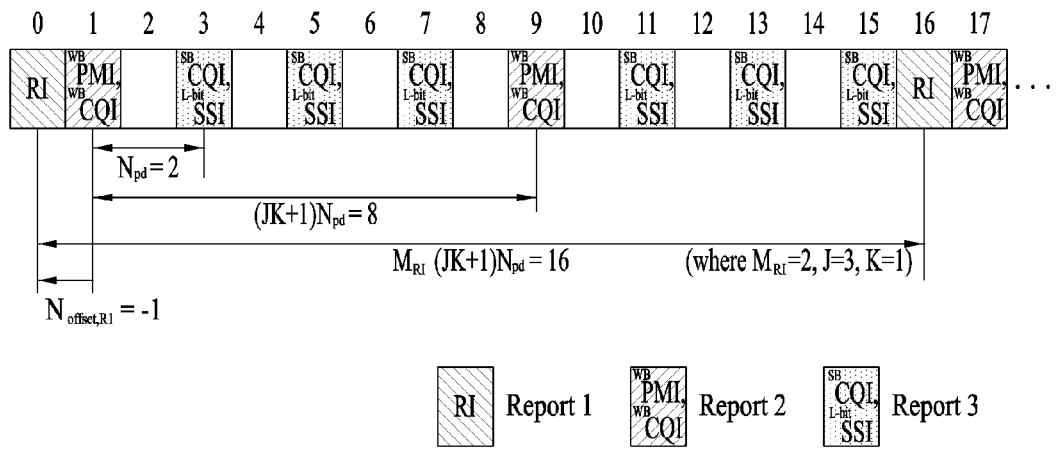

FIG. 13 is a diagram illustrating CSI feedback in case of Mode 2-1 illustrated in FIG. 8.

Referring to FIG. 13, the CSI feedback is composed of transmission of three types of report contents, Report 1, Report 2, and Report 3. In detail, RI is transmitted in Report 1, WB PMI and WB CQI are transmitted in Report 2, and subband (SB) CQI and L-bit subband selection indicator (SSI) are transmitted in Report 3. Report 2 or Report 3 is transmitted in a subframe with a subframe index satisfying (10*nf+floor(ns/2)−N offset, CQI)mod(Npd)=0. In particular, Report 2 is transmitted in a subframe with a subframe index satisfying (10*nf+floor(ns/2)−N offset, CQI)mod(H*Npd)=0. Thus, Report 2 is transmitted every interval of H*Npd and subframes between adjacent Reports 2 are filled by transmitting Report 3. In this case, H satisfies H=J*K+1, where J is the number of bandwidth parts (BPs). K indicates the number of continuously-performed full cycles for selecting a subband for each of different BPs once and transmitting subbands over all BPs and is determined via upper layer signaling. FIG. 13 illustrates a case of Npd=2, J=3, and K=1. Report 1 is transmitted in a subframe with a subframe index satisfying (10*nf+floor(ns/2)−N offset, CQI−N offset, RI)mod(MRI*(J*K+1)*Npd)=0. FIG. 13 illustrates a case of $M_{RI}$=2 and N offset, RI=−1.

Figure 14:
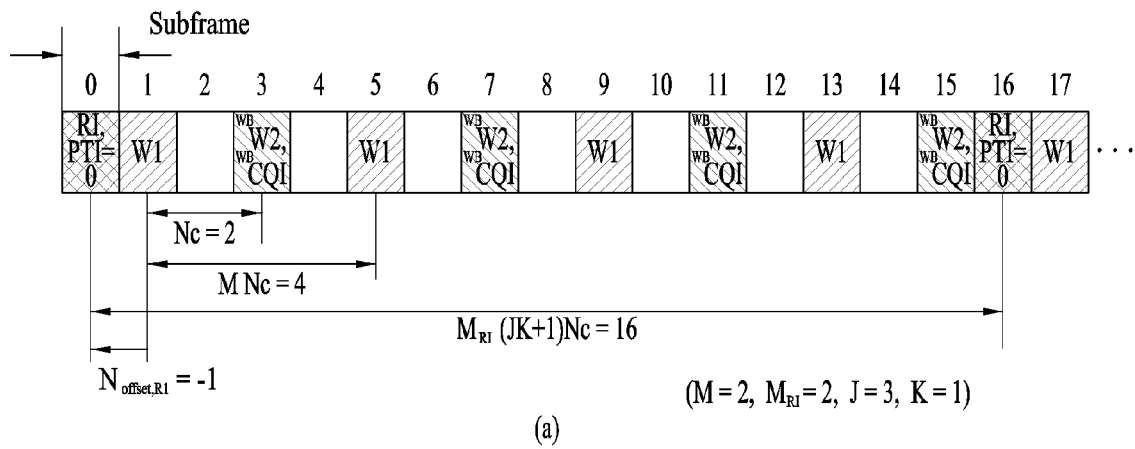
FIG. 14 is a diagram illustrating periodic reporting of CSI when a hierarchical codebook is used.
Figure 14:
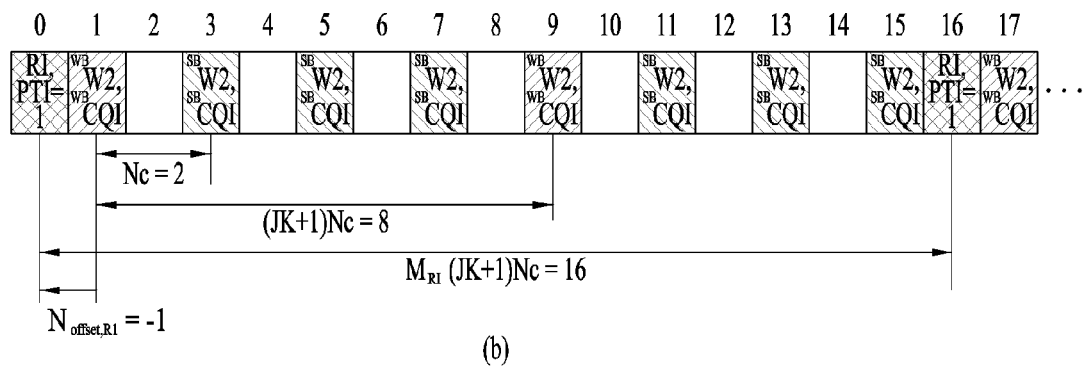
Figure 14:
Figure 14:
Figure 14:
Figure 14:
Figure 14:
Figure 15:
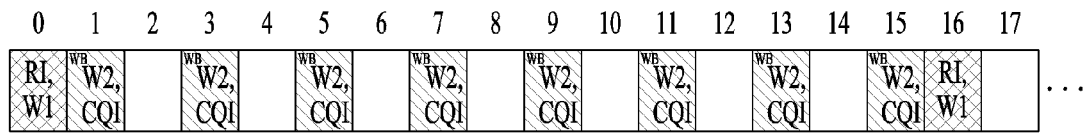
FIG. 15 is a conceptual diagram illustrating a submode A of a PUCCH feedback mode 1-1.

FIG. 14 is a diagram illustrating periodic reporting of CSI that has been discussed in an LTE-A system. When BS has 8 Tx antennas, in case of Mode 2-1, a precoder type indication (PTI) parameter as a 1-bit indicator is set, and a periodic reporting mode subdivided into two types according to a PTI value is considered, as illustrated in FIG. 15. In FIG. 14, W1 and W2 indicate hierarchical codebook described with reference to Equations 8 and 9 above. When both W1 and W2 are determined, precoding matrix W completed by combining W1 and W2 is determined.

Referring to FIG. 14, In case of periodic reporting, different contents corresponding to Report 1, Report 2, and Report 3 are reported according to different reiteration periods. RI and 1-bit PTI are reported in Report 1. WB (WideB and) W1 (when PTI=0) or WB W2 and WB CQI (when PTI=1) are reported in Report 2. WB W2 and WB CQI (when PTI=0) or subband (SB) W2 and SB CQI (when PTI=1) are reported in Report 3.

Report 2 and Report 3 are transmitted in a subframe (for convenience, referred to as a first subframe set) with a subframe index satisfying (10*nf+floor(ns/2)−N offset, CQI) mod (NC)=0. N offset, CQI corresponds to an offset value for transmission of PMI/CQI illustrated in FIG. 9. In addition, Nc indicates a subframe interval between adjacent Reports 2 or Reports 3. FIG. 14 illustrates an example in which N offset, CQI=1 and Nc=2. The first subframe set is composed of subframes with an odd index. of indicates a system frame number (or a radio frame index) and ns indicates a slot index in a radio frame. floor( ) indicates a rounddown function, and A mod B indicates a remainder obtained by dividing A by B.

Report 2 is located in some subframes in the first subframe set and Report 3 is located in the remaining subframes. In detail, Report 2 is located in a subframe with a subframe index satisfying (10*nf+floor(ns/2)−N offset, CQI) mod (H*Nc)=0. Accordingly, Report 2 is transmitted every interval of H*Nc, and one or more first subframes between adjacent Reports 2 are filled by transmitting Report 3. In case of PTI=0, H=M and M is determined via upper layer signaling. FIG. 14 illustrates a case of M=2. In case of PTI=1, H=J*K+1, K is determined via upper layer signaling, and J is the number of BPs. FIG. 14 illustrates a case of J=3 and K=1.

Report 1 is transmitted in a subframe with a subframe index satisfying (10*nf+floor(ns/2)−N offset, CQI−N offset, RI) mod (MRI*(J*K+1)*Nc)=0, and MRI is determined via upper layer signaling. N offset, RI corresponds to a relative offset value for RI. FIG. 14 illustrates a case of MRI=2 and N offset, RI=−1. According to N offset, RI=−1, transmission time for Report 1 and transmission time for Report 2 do not overlap each other. When a UE calculates RI, W1, and W2, RI, W1, and W2 are associated with each other. For example, W1 and W2 are calculated with dependence upon RI, and W2 is calculated with dependence upon W1. At a point of time when both Report 2 and Report 3 are reported after Report 1 is reported, a BS may know final W from W1 and W2.

8 Tx (Transmit Antenna) Codebook

In a more advanced communication system such as LTE-A, acquisition of additional multi-user diversity using Multi-User MIMO (MU-MIMO) is additionally provided. For this reason, a higher accuracy is required in channel feedback. In MU-MIMO, an interference channel exists between UEs multiplexed in an antenna domain. Therefore, accuracy of a feedback channel greatly affects other multiplexed UEs in addition to a UE performing feedback. Thus, in LTE-A, it is determined that a final PMI of the 8Tx codebook is divided into $W^{(1)}$ corresponding to a long term and/or wideband precoder and $W^{(2)}$ corresponding to a short term and/or subband precoder to enhance accuracy of a feedback channel.

An equation for constructing one final PMI from two channel information is represented by a product between $W^{(1)}$ and $W^{(2)}$.

$$W = \text{norm}(W^{(1)} W^{(2)}) \quad \text{[Equation 11]}$$

In Equation 11, W is a precoder generated from $W^{(1)}$ and $W^{(2)}$, and the UE may feed back this information to a base station (BS) (or eNB). norm(A) is a matrix obtained by normalizing the norm of each column of the matrix A to 1.

In the 8Tx codebook defined in LTE, the detailed structures of $W^{(1)}$ and $W^{(2)}$ are given as the following equation.

$$W1(i) = \begin{bmatrix} X_i & 0 \\ 0 & X_i \end{bmatrix}, \quad \text{[Equation 12]}$$

where $X_i$ is Nt/2 by M matrix.

$$W2(j) = \begin{bmatrix} \overbrace{e_M^k \quad e_M^l \quad e_M^m}^{r\, columns} \\ \cdots \\ \alpha_j e_M^k \quad \beta_j e_M^l \quad \gamma_j e_M^m \end{bmatrix}$$

(if rank=r), where 1≤k, l, m≤M and k, l, m are integer.

The codewords are designed so as to reflect correlation characteristics between channels, if cross polarized antennas are densely arranged (usually, the distance between adjacent antennas is equal to or less than half a signal wavelength). The cross polarized antennas may be divided into a horizontal antenna group and a vertical antenna group. The two antenna groups, each of which has the property of a uniform linear array (ULA) antenna, are co-located. Therefore, the correlation between antennas in each group has the same linear phase increment (LPI) property and the correlation between the antenna groups is characterized by phase rotation.

Since the codebook is obtained by quantizing values of channels, it is necessary to design the codebook reflecting channel characteristics corresponding to sources. For example, a Rank-1 codeword satisfying the following equation 13 may be designed to reflect the above-mentioned channel characteristics.

$$W1(i) * W2(j) = \begin{bmatrix} X_i(k) \\ \alpha_j X_i(k) \end{bmatrix} \quad \text{[Equation 13]}$$

In the above equation, the codeword may be expressed as an $N_T \times 1$ vector (where $N_T$ is the number of Tx antennas) and the codeword is composed of an upper vector $X_i(k)$ and a lower vector $\alpha_j X_i(k)$, representing the correlation characteristics between the horizontal antenna group and the vertical antenna group, respectively. $X_i(k)$ may be favorably expressed as a vector having the linear phase increment (LPI) property, reflecting the correlation characteristics between antennas in each antenna group. For example, a DFT matrix may be used as a representative example of $X_i(k)$.

4Tx Dual Codebook Downscaled in 8Tx Codebook

In LTE Rel-10, an 8 Tx codebook for the BS (or eNB) having 8 Tx antennas may be defined. The codebook is a dual codebook structure formed by multiplication of two codebooks, and is composed of a $W^{(1)}$ codebook including wideband/long-term channel information and a $W^{(2)}$ codebook including subband/short-term channel information. In recent times, a codebook similar to the 8 Tx codebook defined in LTE Rel-10 is proposed as one example of the improved 4Tx codebook. The proposed codebook is as follows.

The overall precoder may be denoted by the product of $W^{(1)}$ and $W^{(2)}$ as represented by the following equation 14.

$$W = W^{(1)} W^{(2)} \quad \text{[Equation 14]}$$

In Equation 14, an inner precoder $W^{(1)}$ may be selected from the first codebook $C^{(1)}$ as represented by the following equation 15.

$$C'^{(1)} = \left\{ \begin{bmatrix} \tilde{W}^{(1)} & 0 \\ 0 & \tilde{W}^{(1)} \end{bmatrix} \middle| \tilde{W}^{(1)} = \right. \quad \text{[Equation 15]}$$

$$[w_{2k \bmod 16} \quad w_{(2k+1) \bmod 16} \quad w_{(2k+2) \bmod 16} \quad w_{(2k+3) \bmod 16}],$$

$$\left. k = 0, 1, \ldots, 7 \right\}$$

$$\text{where } w_n = \begin{bmatrix} 1 \\ e^{j\frac{2\pi n}{16}} \end{bmatrix}, n = 0, 1, \ldots, 15$$

The outer precoder $W^{(2)}$ for Rank-1 transmission may be selected from the second codebook $C_1^{(2)}$ as shown in the following equation 16.

$$C_1^{(2)} = \left\{ \begin{bmatrix} Y \\ a_1 Y \end{bmatrix}, \begin{bmatrix} Y \\ -a_1 Y \end{bmatrix}, \begin{bmatrix} Y \\ ja_1 Y \end{bmatrix}, \begin{bmatrix} Y \\ -ja_1 Y \end{bmatrix} \right\} \quad \text{[Equation 16]}$$

$$Y \in \{e_1, e_2, e_3, e_4\}$$

In Equation 16, $e_n$ denotes a selection vector with all zeros except the n-th element (where n is 1 to 4). In Equation 16, $a_n = e^{j\Phi_n}$, and $\phi_n$ is a phase value decided by codeword indexes of $C^{(1)}$ and $C_1^{(2)}$ and performs compensation to allow $$\begin{bmatrix} Y \\ a_1 Y \end{bmatrix}$$

to have LPI characteristics.

The outer precoder $W^{(2)}$ for Rank-2 transmission may be selected from the second codebook $C_2^{(2)}$ as shown in the following equation 17.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\} \quad \text{[Equation 17]}$$

$(Y_1, Y_2) \in \{(e_1, e_1), (e_2, e_2), (e_3, e_3),$ $(e_4, e_4), (e_1, e_2), (e_2, e_3), (e_1, e_4), (e_2, e_4)\}$

In Equation 17, $e_n$ denotes a 4-element selection vector with all zeros except the n-th element. In Equation 17, $a_n = e^{j\Phi_n}$, and $\phi_n$ and $\phi_n$ is a phase value decided by codeword indexes of $C^{(1)}$ and $C_2^{(2)}$ and performs compensation to allow each vector of $$\begin{bmatrix} Y_1 & Y_2 \\ a_1 Y_1 & -a_2 Y_2 \end{bmatrix}$$

to have LPI characteristics.

Rank 1 codeword of the 4Tx codebook is generated as follows. 2×2 DFT matrix is oversampled 8 times, such that the following (2×16) DFT matrix is generated. Assuming that one of 16 vectors is selected and the selected (2×1) vector is denoted by 'v', 'v' is repeatedly concatenated so that a $[v \ v]^T$ (4×1) vector is generated. In consideration of four phase compensation values $\{1, j, -1, -j\}$ for phase compensation of the vertical antenna group and the horizontal antenna group of the 1 antenna, one of $\{[v \ a_1 v]^T, [v \ a_1 * j * v]^T, [v -a_1 * v]^T, [v -a_1 * j * v]^T\}$ is selected. If compensation is not performed using the value of $a_1$, only 8 vectors from among a total of 64 rank-1 vectors may have linear phase increment (LPI) attributes. The value of $a_1$ is multiplied by a lower vector, such that compensation is performed in a manner that a $[v \ a_1 v]^T$—shaped codeword always has LPI attributes. As a result, 16 vectors from among a total of 64 Rank-1 vectors may have LPI attributes. $a_1$ may be determined by a function of the codewords ($C^{(1)}$ and $C_2^{(2)}$)

Channel Characteristics of ULA Antenna

Channel characteristics of the ULA antenna may be denoted by a dominant Eigen vector of a channel. In the channel characteristics generally shown in the correlated environment in which there is a short distance between the ULA antenna ports, the dominant Eigen vector has linear phase increment (LPI) characteristics. Individual antenna ports may be spaced apart from each other at regular intervals, such that output signals of the individual ports may have regular Rx (Receive) delay. That is, there is a reception (Rx) time difference (Δi) between the signal received from the first Tx antenna and the signal received from the i-th Tx antenna. The difference in Rx time may appear as a phase difference of the channel. There is a phase difference (τi) between the signal received from the first Tx antenna and the signal received from the i-th Tx antenna, and the channel has LPI attributes. Therefore, the codebook optimized for the correlated environment in which there is a short distance between the ULA antenna ports may allow each codeword to have LPI attributes.

First Embodiment

The first embodiment relates to the 4Tx codebook of Rank 2.

The above-mentioned 4Tx codebook is composed of a first codebook having the size of 3 bits at each rank and a second codebook having the size of 4 bits at each rank, such that the 4Tx codebook is 7 bits long. (Although the second codebook is divided into $C_1^{(2)}$ and $C_2^{(2)}$ according to a rank, the second codebook is denoted by $C^{(2)}$ without a distinction between ranks for convenience of description.) Some parts of the Rank 1 codewords generated by the codebook may have LPI characteristics in consideration of the ULA antenna. However, the first and second columns from among the Rank 2 codewords generated by the above codebook do not have codewords having LPI characteristics.

Therefore, a method for generating the codebook in a manner that all beam vectors having LPI characteristics at Rank 2 or higher is needed to improve the codebook throughput in a highly correlated ULA antenna. In addition, in order to minimize inter-stream interference, the codebook must be generated in a manner that respective beam vectors are orthonormal to each other. The present invention proposes a codebook having the following two characteristics at Rank 2 or higher. In accordance with the first characteristics, all beam vectors have LPI characteristics. In accordance with the second characteristics, all beam vectors are orthonormal to each other.

The present invention proposes the necessity of codewords in which all beam vectors simultaneously have LPI characteristics and orthonormal characteristics at Rank 2 or higher. In addition, the 4Tx codebook of Rank 2 may be composed of only the codewords having the above characteristics, or may include the codeword having the above characteristics.

The legacy Rank 2 codeword generated based on Equations 14 to 18 may be represented by the following equation 18.

$$\begin{bmatrix} W_n & W_m \\ a_1 w_n & -a_2 w_m \end{bmatrix}, \text{ or } \begin{bmatrix} W_n & W_m \\ ja_1 w_n & -ja_2 w_m \end{bmatrix} \quad \text{[Equation 18]}$$

In Equation 18, n or m may denote random DFT vector indexes selected through $C_2^{(2)}$, and Wn or Wm may indicate one vector selected from among the above oversampled DFT vectors $$w_k = \begin{bmatrix} 1 \\ e^{j\frac{2\pi k}{16}} \end{bmatrix}, k = 0, 1, \ldots, 15.$$

In order for all beam vectors of the Rank-2 codeword shown in Equation 18 to have orthonormal characteristics, the following equation must be satisfied.

$$w_n^H w_m - a_1^H a_2 w_n^H w_m = 0 \qquad \text{[Equation 19]}$$

In order to satisfy Equation 19, $a_1 = a_2$ or $w_n^H w_m$ is needed.

If $a_1 = a_2$ is satisfied and all beam vectors have orthonormal characteristics, the following condition needed for satisfying the LPI characteristics is as follows.

If $a_1 = a_2 = e^{j\phi}$ is given, Equation 18 is represented by the following equation 20.

$$\begin{bmatrix} 1 & 1 \\ e^{j\frac{2\pi}{16}(n)} & e^{j\frac{2\pi}{16}(m)} \\ e^{j\phi} & -e^{j\phi} \\ e^{j(\frac{2\pi}{16}(n+\phi))} & -e^{j(\frac{2\pi}{16}(m+\phi))} \end{bmatrix}, \text{ or} \qquad \text{[Equation 20]}$$

$$\begin{bmatrix} 1 & 1 \\ e^{j\frac{2\pi}{16}(n)} & e^{j\frac{2\pi}{16}(m)} \\ je^{j\phi} & -je^{j\phi} \\ je^{j(\frac{2\pi}{16}(n+\phi))} & -je^{j(\frac{2\pi}{16}(m+\phi))} \end{bmatrix}$$

In Equation 20, if the left side of Equation 20 is given, the following condition must be satisfied in a manner that both vectors have LPI characteristics.

$$\phi = 2\frac{2\pi}{16}(n) = 2\frac{2\pi}{16}(m) + \pi \pm 2\pi \qquad \text{[Equation 21]}$$

In Equation 21, morn may satisfy n=m±4.

However, in the case of using the conventional codebook of Equation 15, |n−m|<4 is given, such that it is impossible to generate the codeword having orthonormal LPI characteristics. Therefore, in order for two vectors constructing the Rank-2 codeword to have LPI characteristics, $C^{(1)}$ and $C_2^{(2)}$ must be designed in the 4Tx codebook.

A first example of the 4Tx codebook of Rank 2 allows all vectors to have LPI characteristics after satisfying Equation 21, and satisfies orthonormal characteristics based on $a_1 = a_2$ from among the conditions of Equation 19.

$C^{(1)}$ and $C_2^{(2)}$ according to the first example of the 4Tx codebook of Rank 2 are as follows.

$$C_{(1)} \begin{cases} \begin{bmatrix} \tilde{W}^{(1)} & 0 \\ 0 & \tilde{W}^{(1)} \end{bmatrix} \\ \tilde{W}^{(1)} = [w_{4k \bmod 16} \quad w_{(4k+1) \bmod 16} \\ \quad w_{(4k+2) \bmod 16} \quad w_{(4k+3) \bmod 16} \\ \quad w_{(4k+4) \bmod 16} \quad w_{(4k+5) \bmod 16} \\ \quad w_{(4k+6) \bmod 16} \quad w_{(4k+7) \bmod 16}], \\ k = 0, 1, 2, 3 \end{cases} \qquad \text{[Equation 22]}$$

The inner precoder $W^{(1)}$ may be selected from the first codebook $C^{(1)}$.

In Equation 22, $$W_n = \begin{bmatrix} 1 \\ e^{j\frac{2\pi n}{16}} \end{bmatrix}, n = 0, 1, \ldots, 15$$

are given, and k is a codeword index of $C^{(1)}$. In addition, $C^{(1)}(k)$ is a k-th codeword of the codebook $C^{(1)}$.

The outer precoder $W^{(2)}$ for Rank-2 transmission may be selected from the second codebook $C_2^{(2)}$ shown in the following equation 23.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\} \qquad \text{[Equation 23]}$$

$(Y_1, Y_2) \in \{(e_1, e_5), (e_2, e_6), (e_3, e_7), (e_4, e_8)\}$ $$C_2^{(2)} = \left\{ \begin{bmatrix} e_1 & e_5 \\ a_1 e_1 & -a_2 e_5 \end{bmatrix}, \begin{bmatrix} e_2 & e_6 \\ a_1 e_2 & -a_2 e_6 \end{bmatrix}, \right.$$
$$\begin{bmatrix} e_3 & e_7 \\ a_1 e_3 & -a_2 e_7 \end{bmatrix}, \begin{bmatrix} e_4 & e_8 \\ a_1 e_4 & -a_2 e_8 \end{bmatrix},$$
$$\begin{bmatrix} e_1 & e_5 \\ ja_1 e_1 & -ja_2 e_5 \end{bmatrix}, \begin{bmatrix} e_2 & e_6 \\ ja_1 e_2 & -ja_2 e_6 \end{bmatrix},$$
$$\left. \begin{bmatrix} e_3 & e_7 \\ ja_1 e_3 & -ja_2 e_7 \end{bmatrix}, \begin{bmatrix} e_4 & e_8 \\ ja_1 e_4 & -ja_2 e_8 \end{bmatrix} \right\}$$

$e_n$ may denote the 4-element selection vector with all zeros except the n-th element. l is a codeword index of the second codebook $C_2^{(2)}$ (where l=0, 1, 2, ..., 7). In addition, $C_2^{(2)}$ is the l-th codeword of the codebook $C_2^{(2)}$, where $$a_1 = a_2 = e^{2j(\frac{2\pi}{16}(4k + l \bmod 4) \bmod 16)}.$$

$C^{(1)}$ according to the first example of the 4Tx codebook of Rank 2 may be generated using the oversampled DFT vector in the same manner as in $C^{(1)}$ of Equation 15.

However, differently from $C^{(1)}$ of Equation 15, $C^{(1)}$ according to the first example of the Rank-2 4Tx codebook is composed of 8 contiguous oversampled DFT vectors. As a result, two beam vectors constructing the Rank-2 codeword may have LPI attributes. Since $C^{(1)}$ of Equation 15 is composed of 4 contiguous oversampled DFT vectors, the final two beam vectors may not have LPI attributes even though the random vector present in $C^{(1)}$ is selected using $C^{(2)}$. That is, in Equation 21, |m−n|=4 is not satisfied.

Therefore, $C^{(1)}$ is composed of a fatter matrix according to the first example of the Rank-2 4Tx codebook, such that the number of DFT vectors capable of being selected through $C^{(2)}$ is increased at the given $C^{(1)}$. That is, in Equation 21, 0<|m−n|<7 is satisfied, such that and 'n' satisfying |m−n|=4 can be found. As a result, two finally generated beam vectors may have LPI attributes.

It may be possible to generate the codeword having LPI attributes using $C^{(1)}$ and $C^{(2)}$ according to a first example of the Rank-2 4Tx codebook. In $C^{(2)}$, $(Y_1, Y_2)$ may be limited to $(e_i, e_{i+4})$. As a result, in Equation 21, |m−n|=4 is always satisfied. In addition, in Equation in which all beam vectors constructing Rank 2 have orthonormal and LPI characteristics, $C_2^{(2)}$ according to the first example of the Rank-2 4Tx codebook may be set to $a_1 = a_2 = e^{j\phi}$, where $$\phi = 2\left(\frac{2\pi}{16}n\right), n = (4k + l\bmod 4)\bmod 16.$$

The second example of the Rank-2 4Tx codebook satisfies Equation 21 in a manner that all vectors have LPI characteristics, and satisfies orthonormal characteristics according to the condition $a_1=a_2$ from among the conditions of Equation 19.

$C^{(1)}$ and $C_2^{(2)}$ according to the second example of the Rank-2 4Tx codebook may be constructed as shown in the following equation 24.

[Equation 24]

$$C^{(1)} = \left\{ \begin{bmatrix} \tilde{W}^{(1)} & 0 \\ 0 & \tilde{W}^{(1)} \end{bmatrix} \middle| \tilde{W}^{(1)} = \right.$$
$$\left. [w_{2k\bmod 8} \quad w_{(2k+1)\bmod 8} \quad w_{(2k+2)\bmod 8} \quad w_{(2k+3)\bmod 8}], k = 0, 1, 2, 3 \right\}$$

The inner precoder $W^{(1)}$ may be selected from the first codebook $C^{(1)}$.

$$w_n = \begin{bmatrix} 1 \\ e^{j\frac{2\pi n}{8}} \end{bmatrix}, n = 0, 1, \ldots, 7$$

In Equation 24, are given, and k is a codeword index of $C^{(1)}$. $C^{(1)}(k)$ is the k-th codeword of the codebook $C^{(1)}$.

The outer precoder $W^{(2)}$ for Rank-2 transmission may be selected from the second codebook $C_2^{(2)}$ shown in the following equation 25.

[Equation 25]

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$(Y_1, Y_2) \in \{(e_1, e_3), (e_2, e_4)\}$ $$C_2^{(2)} =$$
$$\left\{ \begin{bmatrix} e_1 & e_3 \\ a_1 e_1 & -a_2 e_3 \end{bmatrix}, \begin{bmatrix} e_2 & e_4 \\ a_1 e_2 & -a_2 e_4 \end{bmatrix}, \begin{bmatrix} e_1 & e_3 \\ ja_1 e_1 & -ja_2 e_3 \end{bmatrix}, \begin{bmatrix} e_2 & e_4 \\ ja_1 e_2 & -ja_2 e_4 \end{bmatrix} \right\}$$

In Equation 25, $e_n$ may denote a 4-element selection vector with all zeros except the n-th element. l is a codeword index of $C_2^{(2)}$ (where l=0, 1, 2, 3). In addition, $C_2^{(2)}(l)$ is the l-th codeword of the codebook $C_2^{(2)}$, where $$a_1 = a_2 = e^{2j\left(\frac{2\pi}{16}(2k+l\bmod 2)\bmod 8\right)}.$$

$C^{(1)}$ according to the second example of the Rank-2 4Tx codebook may be composed of a matrix equal in size to $C^{(1)}$ of Equation 15.

However, differently from $C^{(1)}$ of Equation 15, $C^{(1)}$ according to the second example of the Rank-2 4Tx codebook may be composed of a DFT vector oversampled four times instead of 8 times, such that two beam vectors constructing the Rank-2 codeword may have LPI attributes. $C^{(1)}$ of Equation 15 is composed of a DFT vector oversampled 8 times, such that the final two beam vectors may not have LPI attributes even though a random vector present in $C^{(1)}$ is selected using $C^{(2)}$.

Therefore, $C^{(1)}$ according to the second example of the Rank-2 4Tx codebook is composed of a DFT vector oversampled four times, and two beam vectors may have LPI attributes through $C^{(2)}$.

In the meantime, according to the first example of the Rank-2 4Tx codebook, in order for two beam vectors selected through $C^{(2)}$ to have LPI attributes, $|m-n|=4$ must be satisfied. However, $C^{(1)}$ according to the second example of the Rank-2 4Tx codebook is composed of a DFT vector oversampled four times, $|m-n|=2$ instead of $|m-n|=4$ must be satisfied. In order to satisfy this condition $|m-n|=2$, $Y_1$, $Y_2) \in \{(e_1, e_3), (e_2, e_4)\}$ may be established in Equation 25. In addition, based on Equation 21 in which all beam vectors constructing Rank 2 have orthonormal and LPI characteristics, $C^{(1)}$ according to the second example of the Rank-2 4Tx codebook may be set to $a_1=a_2=e^{j\phi}$, where $$\phi = 2\frac{2\pi}{16}(n), n = (2k + l\bmod 2)\bmod 8.$$

The third example of the Rank-2 4Tx codebook may satisfy Equation 21 in a manner that all vectors have LPI characteristics, and may satisfy orthonormal characteristics according to $v_n^H v_m = 0$ from among the conditions of Equation 19.

If $v_n^H v_m 0$ is established in Equation 19, two beam vectors of Rank 2 in association with $a_1$, $a_2$ are always orthonormal to each other. Therefore, if the codebook is designed to satisfy $v_n^H v_m 0$, and if $a_1$, $a_2$ are designed in a manner that the beam vector corresponding to each rank has LPI characteristics, the codebook having orthonormal and LPI characteristics may be generated.

The codebook according to the third example of the Rank-2 4Tx codebook is constructed as shown in the following equation 26.

[Equation 26]

$$C^{(1)} =$$
$$\left\{ \begin{bmatrix} \tilde{W}^{(1)} & 0 \\ 0 & \tilde{W}^{(1)} \end{bmatrix} \middle| \right.$$
$$\left. \tilde{W}^{(1)} = [w_{2k\bmod 16} \quad w_{(2k+1)\bmod 16} \quad w_{(2k+2)\bmod 16} \quad \cdots \quad w_{(2k+15)\bmod 16}], k = 0 \right\}$$

The inner precoder $W^{(1)}$ may be selected from the first codebook $C^{(1)}$.

$$w_n = \begin{bmatrix} 1 \\ e^{j\frac{2\pi n}{16}} \end{bmatrix}, n = 0, 1, \ldots, 15$$

In Equation 26, are given, and k is a codeword index of $C^{(1)}$. In addition, $C^{(1)}(k)$ may denote the k-th codeword of the codebook $C^{(1)}$.

The outer precoder $W^{(2)}$ for Rank-2 transmission may be selected from the second codebook $C_2^{(2)}$ shown in Equation 27.

[Equation 27]

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$(Y_1, Y_2) \in \{(e_1, e_9), (e_2, e_{10}), (e_3, e_{11}), (e_4, e_{12}), (e_5, e_{13}), (e_6, e_{14}), (e_7, e_{15}), (e_8, e_{16})\}$ $$C_2^{(2)} = \left\{ \begin{bmatrix} e_1 & e_9 \\ a_1 e_1 & -a_2 e_9 \end{bmatrix}, \begin{bmatrix} e_2 & e_{10} \\ a_1 e_2 & -a_2 e_{10} \end{bmatrix}, \begin{bmatrix} e_3 & e_{11} \\ a_1 e_3 & -a_2 e_{11} \end{bmatrix}, \begin{bmatrix} e_4 & e_{12} \\ a_1 e_4 & -a_2 e_{12} \end{bmatrix}, \begin{bmatrix} e_5 & e_{13} \\ a_1 e_5 & -a_2 e_{13} \end{bmatrix}, \begin{bmatrix} e_6 & e_{14} \\ a_1 e_6 & -a_2 e_{14} \end{bmatrix}, \\ \begin{bmatrix} e_7 & e_{15} \\ a_1 e_7 & -a_2 e_{15} \end{bmatrix}, \begin{bmatrix} e_8 & e_{16} \\ a_1 e_8 & -a_2 e_{16} \end{bmatrix}, \begin{bmatrix} e_1 & e_9 \\ ja_1 e_1 & -ja_2 e_9 \end{bmatrix}, \begin{bmatrix} e_2 & e_{10} \\ ja_1 e_2 & -ja_2 e_{10} \end{bmatrix}, \begin{bmatrix} e_3 & e_{11} \\ ja_1 e_3 & -ja_2 e_{11} \end{bmatrix}, \begin{bmatrix} e_4 & e_{12} \\ ja_1 e_4 & -ja_2 e_{12} \end{bmatrix}, \\ \begin{bmatrix} e_5 & e_{13} \\ ja_1 e_5 & -ja_2 e_{13} \end{bmatrix}, \begin{bmatrix} e_6 & e_{14} \\ ja_1 e_6 & -ja_2 e_{14} \end{bmatrix}, \begin{bmatrix} e_7 & e_{15} \\ ja_1 e_7 & -ja_2 e_{15} \end{bmatrix}, \begin{bmatrix} e_8 & e_{16} \\ ja_1 e_8 & -ja_2 e_{16} \end{bmatrix} \right\}$$

In Equation 27, $e_n$ may denote the 4-element selection vector with all zeros except the n-th element. l is a codeword index of $C_2^{(2)}$ (where l=0, 1, 2, . . . , 15). In addition, $C_2^{(2)}$ (l) is the l-th codeword of the codebook $C_2^{(2)}$, where $$a_1 = e^{2j\left(\frac{2\pi}{16}(l \bmod 8)\right)}, \quad a_2 = e^{2j\left(\frac{2\pi}{16}((l \bmod 8)+8)\right)+j\pi}.$$

$C^{(1)}$ according to the third example of the Rank-2 4Tx codebook may be composed of a DFT vector oversampled 8 times, and may have one codeword composed of all DFT vectors. $C_2^{(2)}$ according to the third example of the Rank-2 4Tx codebook may be limited to $(Y_1, Y_2)=\{e_i, e_{i+8}\}$, such that the condition $v_n^H v_m = 0$ in Equation 19 may be satisfied. That is, according to the Rank-2 codeword of Equations 26 and 27, two beam vectors may be orthonormal to each other, and $a_1$ and $a_2$ are established as shown in Equation 27, such that each beam vector may have LPI characteristics.

Although the first to third examples of the Rank-2 4Tx codebook have been disclosed on the assumption of Rank 2, the scope of the present invention is not limited to Rank 2, and the present invention may include a random codebook designed to satisfy LPI and orthonormal characteristics at Rank 2 or higher according to the above-mentioned scheme. In addition, some parts of the above-mentioned Rank-2 codebook may be subsampled, or the present invention may further include other codebooks including the above codebook.

The following description will disclose an exemplary case in which the above-mentioned condition of the Rank-2 4Tx codebook is satisfied, the number of bits of the inner precoder $W^{(1)}$ is set to 4, and the outer precoder of $W^{(2)}$ is set to 1.

First, the inner precoder $W^{(1)}$ may be established as shown in the following equation 28.

$$W_1(l) = \begin{bmatrix} \tilde{W}_1(l) & 0 \\ 0 & \tilde{W}_1(l) D_a(l) \end{bmatrix}, l \in \{0, 1, 2, \ldots, 15\} \quad \text{[Equation 28]}$$

In Equation 28, $\tilde{W}_1(l)$ may be established as shown in following equation 29.

$$\tilde{W}_1(l) = \quad \text{[Equation 29]}$$
$$[w_{(l) \bmod 16} \quad w_{(l+1) \bmod 16} \quad \cdots \quad w_{(l+6) \bmod 16} \quad w_{(l+7) \bmod 16}],$$

-continued $$w_n = \begin{bmatrix} 1 \\ e^{j\frac{2\pi n}{16}} \end{bmatrix}$$

In addition, as shown in the following equation 30, $D_a(l)$ may be composed of the p-th row and the q-th column, where p and q may start from zero '0'.

$$\{D_a(l)\}_{pq} = \begin{cases} e^{2j\frac{2\pi \cdot ((l+(p \bmod 4)) \bmod 16)}{16}}, & p = q \\ 0, & p \neq q \end{cases} \quad \text{[Equation 30]}$$

$W^{(2)}$ may be established as shown in the following equation.

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (3, 7)\} \text{ or}$$

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6)\}.$$

The following description will disclose an exemplary case in which the above-mentioned condition of the Rank-2 4Tx codebook is satisfied, the number of bits of the inner precoder $W^{(1)}$ is set to 3, and the outer precoder of $W^{(2)}$ is set to 2.

First, the inner precoder $W^{(1)}$ may be established as shown in the following equation 31.

$$W_1(l) = \begin{bmatrix} \tilde{W}_1(l) & 0 \\ 0 & \tilde{W}_1(l) D_a(l) \end{bmatrix}, l \in \{0, 1, 2, \ldots, 7\} \quad \text{[Equation 31]}$$

In Equation 31, $\tilde{W}_1(l)$ may be established as shown in the following equation 32.

[Equation 32]

$$\tilde{W}_1(l) = [w_{(2l) \bmod 16} \quad w_{(2l+1) \bmod 16} \quad \cdots \quad w_{(2l+6) \bmod 16} \quad w_{(2l+7) \bmod 16}],$$

$$w_n = \begin{bmatrix} 1 \\ e^{j\frac{2\pi n}{16}} \end{bmatrix}$$

In addition, as shown in the following equation 33, $D_a(l)$ may be composed of the p-th row and the q-th column, where p and q may start from zero '0'.

$$\{D_a(l)\}_{pq} = \begin{cases} e^{2 \cdot j \frac{2\pi \cdot ((2l+(p \bmod 4)) \bmod 16)}{16}}, & p = q \\ 0, & p \neq q \end{cases} \quad \text{[Equation 33]}$$

$W^{(2)}$ may be established as shown in the following equation.

$$W_2(n_1, n_2) = \begin{bmatrix} e_{n_1} & e_{n_2} \\ e_{n_1} & -e_{n_2} \end{bmatrix},$$

$(n_1, n_2) \in \{(1, 5), (2, 6), (3, 7), (4, 8)\}.$

The following description will disclose an exemplary case in which the above-mentioned condition of the Rank-2 4Tx codebook is satisfied, the number of bits of the inner precoder $W^{(1)}$ is set to 3, and the outer precoder of $W^{(2)}$ is set to 1.

First, the inner precoder $W^{(1)}$ may be established as shown in the following equation 34.

$$W_1(l) = \begin{bmatrix} \tilde{W}_1(l) & 0 \\ 0 & \tilde{W}_1(l)D_a(l) \end{bmatrix}, \quad \text{[Equation 34]}$$

$l \in \{0, 1, 2, \ldots, 7\}$

In Equation 34, $\tilde{W}_1(l)$ may be established as shown in the following equation 35.

[Equation 35]

$\tilde{W}_1(l) = [w_{(2l) \bmod 16} \quad w_{(2l+1) \bmod 16} \quad \cdots \quad w_{(2l+6) \bmod 16} \quad w_{(2l+7) \bmod 16}],$ $$w_n = \begin{bmatrix} 1 \\ e^{j\frac{2\pi n}{16}} \end{bmatrix}$$

In addition, as shown in the following equation 36, $D_a(l)$ may be composed of the p-th row and the q-th column, where p and q may start from zero '0'.

$$\{D_a(l)\}_{pq} = \begin{cases} e^{2 \cdot j \frac{2\pi \cdot ((2l+(p \bmod 4)) \bmod 16)}{16}}, & p = q \\ 0, & p \neq q \end{cases} \quad \text{[Equation 36]}$$

$W^{(2)}$ may be established as shown in the following equation.

$$W_2(n_1, n_2) = \begin{bmatrix} e_{n_1} & e_{n_2} \\ e_{n_1} & -e_{n_2} \end{bmatrix},$$

$(n_1, n_2) \in \{(1, 5), (3, 7)\}$ or $$W_2(n_1, n_2) = \begin{bmatrix} e_{n_1} & e_{n_2} \\ e_{n_1} & -e_{n_2} \end{bmatrix},$$

$(n_1, n_2) \in \{(1, 5), (2, 6)\}.$

The following description will disclose an exemplary case in which the above-mentioned condition of the Rank-2 4Tx codebook is satisfied, the number of bits of the inner precoder $W^{(1)}$ is set to 4, and the outer precoder of $W^{(2)}$ is set to 2.

$W^{(1)}$ may be established as shown in the following equation 37.

$$W_1(l) = \begin{bmatrix} \tilde{W}_1(l) & 0 \\ 0 & \tilde{W}_1(l)D_a(l) \end{bmatrix}, \quad \text{[Equation 37]}$$

$l \in \{0, 1, 2, \ldots, 15\}$

In Equation 37, $\tilde{W}_1(l)$ may be established as shown in the following equation 38.

[Equation 38]

$\tilde{W}_1(l) = [w_{(l) \bmod 16} \quad w_{(l+1) \bmod 16} \quad \cdots \quad w_{(l+6) \bmod 16} \quad w_{(l+7) \bmod 16}],$ $$w_n = \begin{bmatrix} 1 \\ e^{j\frac{2\pi n}{16}} \end{bmatrix}$$

In addition, as shown in the following equation 39, $D_a(l)$ may be composed of the p-th row and the q-th column, where p and q may start from zero '0'.

$$\{D_a(l)\}_{pq} = \begin{cases} e^{2 \cdot j \frac{2\pi \cdot ((l+(p \bmod 4)) \bmod 16)}{16}}, & p = q \\ 0, & p \neq q \end{cases} \quad \text{[Equation 39]}$$

$W^{(2)}$ may be established as shown in the following equation.

$$W_2(n_1, n_2) = \begin{bmatrix} e_{n_1} & e_{n_2} \\ e_{n_1} & -e_{n_2} \end{bmatrix},$$

$(n_1, n_2) \in \{(1, 5), (2, 6), (3, 7), (4, 8)\}.$

Second Embodiment

The second embodiment relates to the 4Tx codebook of Rank 3 or Rank 4.

In association with the Rank-3 or Rank-4 4Tx codebook, the LTE Rel-8 4Tx codebook is properly sampled such that the codebook size can be reduced. In a high rank environment, system performance is insensitive to the codebook size as compared to the low rank. For example, if a receiver is not used as an IRC receiver, performance is not affected by all kinds of precoders at a maximum rank (Max Rank). For this reason, the LTE 8Tx codebook is designed in a manner that the codebook size is greatly reduced at a high rank, such that the codebook size is set to 0 bits at Rank 8. A new codebook generated by sampling the LTE Rel-8 4Tx codebook will hereinafter be described in consideration of the above principles. According to this new codebook, the codebook size can be reduced such that feedback overhead can also be reduced.

LTE Rel-8 4Tx codebook may be achieved by selecting column vectors of Rank-N from among respective matrices (shown in the following equation) according to a predefined scheme.

For example, if Rank is set to 4, the 4Tx codebook is as follows.

First, respective matrices of the BPSK modulation method from among the Rank-4 4Tx codebooks are represented by the following equation 40.

$$W_0 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$$ [Equation 40]

$$W_2 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix}$$

$$W_8 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix}$$

$$W_{10} = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}$$

$$W_{12} = \frac{1}{2}\begin{bmatrix} 1 & 1 & 1 & -1 \\ 1 & 1 & -1 & 1 \\ 1 & -1 & 1 & 1 \\ -1 & 1 & 1 & 1 \end{bmatrix}$$

$$W_{13} = \frac{1}{2}\begin{bmatrix} 1 & 1 & -1 & 1 \\ 1 & 1 & 1 & -1 \\ -1 & 1 & 1 & 1 \\ 1 & -1 & 1 & 1 \end{bmatrix}$$

$$W_{14} = \frac{1}{2}\begin{bmatrix} 1 & -1 & 1 & 1 \\ -1 & 1 & 1 & 1 \\ 1 & 1 & 1 & -1 \\ 1 & 1 & -1 & 1 \end{bmatrix}$$

$$W_{15} = \frac{1}{2}\begin{bmatrix} 1 & -1 & -1 & -1 \\ -1 & 1 & -1 & -1 \\ -1 & -1 & 1 & -1 \\ -1 & -1 & -1 & 1 \end{bmatrix}$$

Respective matrices of the QPSK modulation method from among the Rank-4 4Tx codebook are shown in the following equation 41.

$$W_1 = \frac{1}{2}\begin{bmatrix} 1 & -j & -1 & j \\ j & 1 & j & 1 \\ -1 & -j & 1 & j \\ -j & 1 & -j & 1 \end{bmatrix}$$ [Equation 41]

$$W_3 = \frac{1}{2}\begin{bmatrix} 1 & j & -1 & -j \\ -j & 1 & -j & 1 \\ -1 & j & 1 & -j \\ j & 1 & j & 1 \end{bmatrix}$$

$$W_9 = \frac{1}{2}\begin{bmatrix} 1 & -j & 1 & -j \\ j & 1 & -j & -1 \\ 1 & j & 1 & j \\ j & -1 & -j & 1 \end{bmatrix}$$

$$W_{11} = \frac{1}{2}\begin{bmatrix} 1 & j & 1 & j \\ -j & 1 & j & -1 \\ 1 & -j & 1 & -j \\ -j & -1 & j & 1 \end{bmatrix}$$

In addition, the symbol of each imaginary part shown in the matrices of Equation 41 may be changed as shown in the following equation 42.

$$W_1 = \frac{1}{2}\begin{bmatrix} 1 & j & -1 & -j \\ -j & 1 & -j & 1 \\ -1 & j & 1 & -j \\ j & 1 & j & 1 \end{bmatrix}$$ [Equation 42]

$$W_3 = \frac{1}{2}\begin{bmatrix} 1 & -j & -1 & j \\ j & 1 & j & 1 \\ -1 & -j & 1 & j \\ -j & 1 & -j & 1 \end{bmatrix}$$

$$W_9 = \frac{1}{2}\begin{bmatrix} 1 & j & 1 & j \\ -j & 1 & j & -1 \\ 1 & -j & 1 & -j \\ -j & -1 & j & 1 \end{bmatrix}$$

$$W_{11} = \frac{1}{2}\begin{bmatrix} 1 & -j & 1 & -j \\ j & 1 & -j & -1 \\ 1 & j & 1 & j \\ j & -1 & -j & 1 \end{bmatrix}$$

Respective matrices regarding the 8PSK modulation method from among the Rank-4 4Tx codebooks are represented by the following equation 43.

$$W_4 = \frac{1}{2}\begin{bmatrix} 1 & \frac{1-j}{\sqrt{2}} & -j & \frac{-1-j}{\sqrt{2}} \\ \frac{1+j}{\sqrt{2}} & 1 & \frac{-1+j}{\sqrt{2}} & j \\ j & \frac{-1-j}{\sqrt{2}} & 1 & \frac{-1+j}{\sqrt{2}} \\ \frac{-1+j}{\sqrt{2}} & -j & \frac{-1-j}{\sqrt{2}} & 1 \end{bmatrix}$$ [Equation 43]

$$W_7 = \frac{1}{2}\begin{bmatrix} 1 & \frac{1+j}{\sqrt{2}} & j & \frac{-1+j}{\sqrt{2}} \\ \frac{1-j}{\sqrt{2}} & 1 & \frac{-1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix}$$

-continued $$W_5 = \frac{1}{2}\begin{bmatrix} 1 & \frac{-1-j}{\sqrt{2}} & j & \frac{1-j}{\sqrt{2}} \\ \frac{-1+j}{\sqrt{2}} & 1 & \frac{1+j}{\sqrt{2}} & -j \\ -j & \frac{1-j}{\sqrt{2}} & 1 & \frac{1+j}{\sqrt{2}} \\ \frac{1+j}{\sqrt{2}} & j & \frac{1-j}{\sqrt{2}} & 1 \end{bmatrix}$$

$$W_6 = \frac{1}{2}\begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & j \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix}$$

In addition, the symbol of each imaginary part shown in the matrices of Equation 43 may also be changed as shown in the following equation.

$$W_4 = \frac{1}{2}\begin{bmatrix} 1 & \frac{1+j}{\sqrt{2}} & j & \frac{-1+j}{\sqrt{2}} \\ \frac{1-j}{\sqrt{2}} & 1 & \frac{-1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix}$$

$$W_7 = \frac{1}{2}\begin{bmatrix} 1 & \frac{1-j}{\sqrt{2}} & -j & \frac{-1-j}{\sqrt{2}} \\ \frac{1+j}{\sqrt{2}} & 1 & \frac{-1+j}{\sqrt{2}} & j \\ j & \frac{-1-j}{\sqrt{2}} & 1 & \frac{-1+j}{\sqrt{2}} \\ \frac{-1+j}{\sqrt{2}} & -j & \frac{-1-j}{\sqrt{2}} & 1 \end{bmatrix}$$

$$W_5 = \frac{1}{2}\begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & j \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix}$$

$$W_6 = \frac{1}{2}\begin{bmatrix} 1 & \frac{-1-j}{\sqrt{2}} & j & \frac{1-j}{\sqrt{2}} \\ \frac{-1+j}{\sqrt{2}} & 1 & \frac{1+j}{\sqrt{2}} & -j \\ -j & \frac{1-j}{\sqrt{2}} & 1 & \frac{1+j}{\sqrt{2}} \\ \frac{1+j}{\sqrt{2}} & j & \frac{1-j}{\sqrt{2}} & 1 \end{bmatrix}$$

In another example, 3 column vectors may be selected according to the scheme predefined in the Rank-4 4Tx codebook at Rank 3, and may be multiplied by $$\frac{1}{\sqrt{3}}$$

instead of ½ located at the front part of each matrix so as to implement normalization. In more detail, if Rank is set to 3, the 4Tx codebook is as follows.

Respective matrices for the BPSK modulation method from among the Rank-3 4Tx codebooks are represented by the following equation 44.

$$W_0 = \frac{1}{\sqrt{3}}\begin{bmatrix} 1 & 1 & 1 \\ 1 & 1 & -1 \\ 1 & -1 & -1 \\ 1 & -1 & 1 \end{bmatrix}$$ [Equation 44]

$$W_2 = \frac{1}{\sqrt{3}}\begin{bmatrix} 1 & -1 & 1 \\ -1 & 1 & 1 \\ 1 & 1 & 1 \\ -1 & -1 & 1 \end{bmatrix}$$

$$W_8 = \frac{1}{\sqrt{3}}\begin{bmatrix} 1 & 1 & -1 \\ 1 & 1 & 1 \\ -1 & 1 & -1 \\ -1 & 1 & 1 \end{bmatrix}$$

$$W_{10} = \frac{1}{\sqrt{3}}\begin{bmatrix} 1 & -1 & -1 \\ -1 & 1 & -1 \\ -1 & -1 & 1 \\ 1 & 1 & 1 \end{bmatrix}$$

$$W_{12} = \frac{1}{\sqrt{3}}\begin{bmatrix} 1 & 1 & 1 \\ 1 & 1 & -1 \\ 1 & -1 & 1 \\ -1 & 1 & 1 \end{bmatrix}$$

$$W_{13} = \frac{1}{\sqrt{3}}\begin{bmatrix} 1 & 1 & -1 \\ 1 & 1 & 1 \\ -1 & 1 & 1 \\ 1 & -1 & 1 \end{bmatrix}$$

$$W_{14} = \frac{1}{\sqrt{3}}\begin{bmatrix} 1 & -1 & 1 \\ -1 & 1 & 1 \\ 1 & 1 & 1 \\ 1 & 1 & -1 \end{bmatrix}$$

$$W_{15} = \frac{1}{\sqrt{3}}\begin{bmatrix} 1 & -1 & -1 \\ -1 & 1 & -1 \\ -1 & -1 & 1 \\ -1 & -1 & -1 \end{bmatrix}$$

Respective matrices for the QPSK modulation method from among the Rank-3 4Tx codebooks may be represented by the following equation 45.

$$W_1 = \frac{1}{\sqrt{3}}\begin{bmatrix} 1 & -j & -1 \\ j & 1 & j \\ -1 & -j & 1 \\ -j & 1 & -j \end{bmatrix}$$ [Equation 45]

$$W_3 = \frac{1}{\sqrt{3}}\begin{bmatrix} 1 & j & -1 \\ -j & 1 & -j \\ -1 & j & 1 \\ j & 1 & j \end{bmatrix}$$

$$W_9 = \frac{1}{\sqrt{3}}\begin{bmatrix} 1 & 1 & -j \\ j & -j & -1 \\ 1 & 1 & j \\ j & -j & 1 \end{bmatrix}$$

$$W_{11} = \frac{1}{\sqrt{3}}\begin{bmatrix} 1 & 1 & j \\ -j & j & -1 \\ 1 & 1 & -j \\ -j & j & 1 \end{bmatrix}$$

Respective matrices for the 8PSK modulation method from among the Rank-3 4Tx codebooks may be represented by the following equation 46.

$$W_4 = \frac{1}{\sqrt{3}}\begin{bmatrix} 1 & \frac{1-j}{\sqrt{2}} & \frac{-1-j}{\sqrt{2}} \\ \frac{1+j}{\sqrt{2}} & 1 & j \\ j & \frac{-1-j}{\sqrt{2}} & \frac{-1+j}{\sqrt{2}} \\ \frac{-1+j}{\sqrt{2}} & -j & 1 \end{bmatrix}$$ [Equation 46]

$$W_7 = \frac{1}{\sqrt{3}}\begin{bmatrix} 1 & j & \frac{-1+j}{\sqrt{2}} \\ \frac{1-j}{\sqrt{2}} & \frac{-1-j}{\sqrt{2}} & -j \\ -j & 1 & \frac{-1-j}{\sqrt{2}} \\ \frac{-1-j}{\sqrt{2}} & \frac{-1+j}{\sqrt{2}} & 1 \end{bmatrix}$$

$$W_5 = \frac{1}{\sqrt{3}}\begin{bmatrix} 1 & \frac{-1-j}{\sqrt{2}} & \frac{1-j}{\sqrt{2}} \\ \frac{-1+j}{\sqrt{2}} & 1 & -j \\ -j & \frac{1-j}{\sqrt{2}} & \frac{1+j}{\sqrt{2}} \\ \frac{1+j}{\sqrt{2}} & j & 1 \end{bmatrix}$$

$$W_6 = \frac{1}{\sqrt{3}}\begin{bmatrix} 1 & -j & \frac{1+j}{\sqrt{2}} \\ \frac{-1-j}{\sqrt{2}} & \frac{1-j}{\sqrt{2}} & j \\ j & 1 & \frac{1-j}{\sqrt{2}} \\ \frac{1-j}{\sqrt{2}} & \frac{1+j}{\sqrt{2}} & 1 \end{bmatrix}$$

An alphabet configured to achieve each codeword may be considered according to a first principle for sampling the Rank-3 or Rank-4 4Tx codebook. Whereas each matrix for the BPSK modulation method has only a real part, the QPSK or 8PSK matrix has an imaginary part. Since the number of calculation times is increased due to the imaginary parts when the actual UE is implemented, it may be preferable that the codebook composed of only the BPSK matrix values be designed.

Channel characteristics at a high rank according to the second principle for sampling the codebook may be considered. Since the X-pol and the ULA antenna have different channel characteristics, it may be preferable that different codebooks optimized for each antenna configuration be used. However, as compared to the low rank, performance is not greatly affected by the codebook at a high rank, such that using only one codebook may be beneficial to complexity.

Channel characteristics of the X-pol antenna may be considered according to the third principle for sampling the codebook. In order to generate one codebook operating well in X-pol and ULA, channel characteristics of two antenna configurations must be well reflected. From the viewpoint of ULA, it may be preferable that a column vector indicating each beam have linear phase increment (LPI) attributes. However, there is a low probability of generating a high rank at a ULA in which antennas are arranged at intervals of a short distance, and there is a high probability in which the singular vectors of the channel may not have LPI attributes in the ULA in which antennas are arranged at intervals of a long distance, such that the operation for maintaining LPI attributes of the codebook at a high rank may be undesirable. Accordingly, it may be preferable that the codebook optimized for the X-pol channel be designed. As described above, in the X-pol channel, each channel of the horizontal antenna and each channel of the vertical antenna are composed of the same values, and there is a phase difference between two antennas. Therefore, it may be preferable that the codebook for maintaining the above structure be selected from the Rel-8 codebook.

Considering the above-mentioned three principles, the Rank-3 or Rank-4 codebook composed of 1 bit, 2 bits, or 3 bits is proposed.

The Rank-3 or Rank-4 codebook of 1 bit may be constructed as follows.

The 1-bit codebook may be composed of only W0 and W2 in Equation 40.

The Rel-8 scheme may be applied to a method for selecting the column vector permutation and the column vector at each rank without change.

The 1-bit codebook is composed of BPSK values according to the first principle, may be commonly applied to all antenna configurations according to the second principle, and may satisfy the X-pol channel structure according to the third principle.

The Rank-3 or Rank-4 codebook composed of 2 bits may be constructed as follows.

The 2-bit codebook may be composed of W0, W2, W8, and W10 in Equations 40 to 46.

For example, the codebook indexes of 0, 2, 8 and 10 may be acquired by applying the second PMI index ($I_{PMI2}$) having one value from among 0 to 3 to the following equation 47.

$$2I_{PMI2} + 4 \cdot \lfloor I_{PMI2}/2 \rfloor$$ [Equation 47]

The operation for performing column vector permutation and column vector selection at each rank may be applied to the Rel-8 scheme without change.

The 2-bit codebook may be composed of BPSK values according to the first principle, may be commonly applied to all antenna configurations according to the second principle, and may satisfy the X-pol channel structure according to the third principle.

In another example, the Rank-3 or Rank-4 codebook of 2 bits may be composed of only W1, W3, W9, and W11 in Equations 40 to 46. The operation for performing column vector permutation and column vector selection at each rank may be applied to the Rel-8 scheme without change. This codebook may be composed of the QPSK values, may be commonly applied to all antenna configurations according to the second principle, and may satisfy the X-pol channel structure according to the third principle.

In another example, the Rank-3 or Rank-4 codebook of 2 bits may be composed of W4, W5, W6, and W7 in Equations 40 to 46. The operation for performing column vector permutation and column vector selection at each rank may be applied to the Rel-8 scheme without change. This codebook may be composed of 8PSK values, may be commonly applied to all antenna configurations according to the second principle, and may satisfy the X-pol channel structure according to the third principle.

The Rank-3 or Rank-4 codebook of 3 bits may be constructed as follows.

The 3-bit codebook may be composed of W0, W2, W8, W10, W12, W13, W14, and W15 in Equations 40 to 46. The operation for performing column vector permutation and column vector selection at each rank may be applied to the Rel-8 scheme without change.

The 3-bit codebook may be composed of BPSK values according to the first principle, and may be commonly applied to all antenna configurations according to the second principle. However, since W12, W13, W14, and W15 may not satisfy the X-pol channel structure, they are not based on the third principle.

In another example, the 3-bit codebook may be composed of only W0, W2, W8, W10, W1, W3, W9, and W11 in Equations 40 to 46. The operation for performing column vector permutation and column vector selection at each rank may be applied to the Rel-8 scheme without change. The above-mentioned codebook may not satisfy the first principle. However, the codebook may be commonly applied to all antenna configurations according to the second principle, and may satisfy the X-pol channel structure according to the third principle.

In another example, the 3-bit codebook may be composed of W0, W2, W8, W10, W4, W5, W6, and W7 in Equations 40 to 46. The operation for performing column vector permutation and column vector selection at each rank may be applied to the Rel-8 scheme without change. The codebook may not satisfy the first principle. However, the codebook may be commonly applied to all antenna configurations according to the second principle, and may satisfy the X-pol channel structure according to the third principle.

Subsequently, as the 0-bit codebook, although the above-mentioned codebook is used for Rank 3, it should be noted that the codebook may not be constructed for Rank 4. That is, the Rank-4 codebook may be fixed to the (4×4) identity matrix.

Third Embodiment

The third embodiment relates to the codebook subsampling method based on a PUCCH feedback mode at Rank 3 or 4.

In LTE Rel-12, the 4Tx codebook superior to the conventional codebook has been discussed. A new codebook having the (W1, W2) dual codebook structure at Rank 1 or 2 has been introduced. If the legacy Rel-8 codebook is used for Rank 3 or 4, the codebook subsampling of the PUCCH feedback modes 1-1 and 2-1 is proposed.

In the PUCCH feedback mode 1-1, the submodes A and B are present when the dual codebook structure is used.

FIG. 15 is a conceptual diagram illustrating the submode A of the PUCCH feedback mode 1-1.

Referring to FIG. 15, the wideband W1 and the wideband CQI may be composed of the offset 1 and the period 2, and R1 and W1 may be composed of the offset 0 and the period 16.

In the 8Tx codebook, R1 and W1 may be joint-encoded with 5 bits as shown in the following Table 1. Here, W1 may be subsampled as follows. As a result, the payload size of RI and W1 is reduced so that information can be reported at a low coding rate. RI may be referred by the remaining PMI and CQI values, such that it is necessary for RI to be encoded at a low coding rate in such a manner that the decoding error may not occur in the RI value.

TABLE 1

| hypotheses | RI | values |
|---|---|---|
| 0-7 | 1 | {0, 2, 4, 6, 8, 10, 12, 14} |
| 8-15 | 2 | {0, 2, 4, 6, 8, 10, 12, 14} |
| 16-17 | 3 | {0, 2} |
| 18-19 | 4 | {0, 2} |
| 20-21 | 5 | {0, 2} |
| 22-23 | 6 | {0, 2} |
| 24-25 | 7 | {0, 2} |
| 26 | 8 | {0} |
| 27-31 | reserved | NA |

In LTEA Rel-12, if the 4Tx dual codebook for Rank 1 or 2 is introduced, and if the legacy Rel-8 4Tx codebook for Rank 3 or 4 is used, W1 and RI subsampled in a similar way to the 8Tx case may be joint-encoded, so that the joint-encoded result may be set to 5 bits or less. For example, the codebook may be subsampled by applying 3 bits to Rank 3 or 4 according to one of the following Tables 2 to 4.

TABLE 2

| hypotheses | RI | W1 values |
|---|---|---|
| 0-k | 1 | To Be Determined |
| (k + 1)-n | 2 | To Be Determined |
| (n + 1)-(n + 8) | 3 | {0, 2, 8, 10, 12, 13, 14, 15} |
| (n + 9)-(n + 16) | 4 | {0, 2, 8, 10, 12, 13, 14, 15} |

TABLE 3

| hypotheses | RI | W1 values |
|---|---|---|
| 0-k | 1 | To Be Determined |
| (k + 1)-n | 2 | To Be Determined |
| (n + 1)-(n + 8) | 3 | {0, 2, 8, 10, 1, 3, 9, 11} |
| (n + 9)-(n + 16) | 4 | {0, 2, 8, 10, 1, 3, 9, 11} |

TABLE 4

| hypotheses | RI | W1 values |
|---|---|---|
| 0-k | 1 | To Be Determined |
| (k + 1)-n | 2 | To Be Determined |
| (n + 1)-(n + 8) | 3 | {0, 2, 8, 10, 4, 5, 6, 7} |
| (n + 9)-(n + 16) | 4 | {0, 2, 8, 10, 4, 5, 6, 7} |

One of Tables 2 to 4 may be established by the subsampling scheme of Rank 3 or 4. That is, the 3-bit codebook subsampled from the Rel-8 codebook according to the above-mentioned codebook subsampling principle may be equally applied to the PUCCH feedback mode 1-1.

In Mode 1-1, W2 of Rank 3 or 4 may not be transmitted. That is, only W1 may be present as PMI at Rank 3 or 4. In Tables 2 to 4, "To Be Determined" of Rank 1 or 2 may be determined to be {0, 2, 4, 6, 8, 10, 12, 14} in the same manner as in the 8Tx case. In this case, k may be set to 7, and n may be set to 15.

Figure 16:
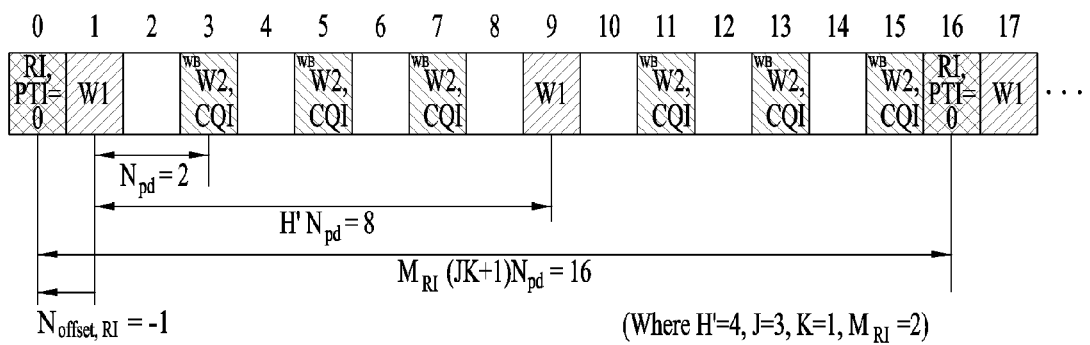
FIG. 16 is a conceptual diagram illustrating a PUCCH feedback mode 2-1 based on a PTI value.
Figure 16:
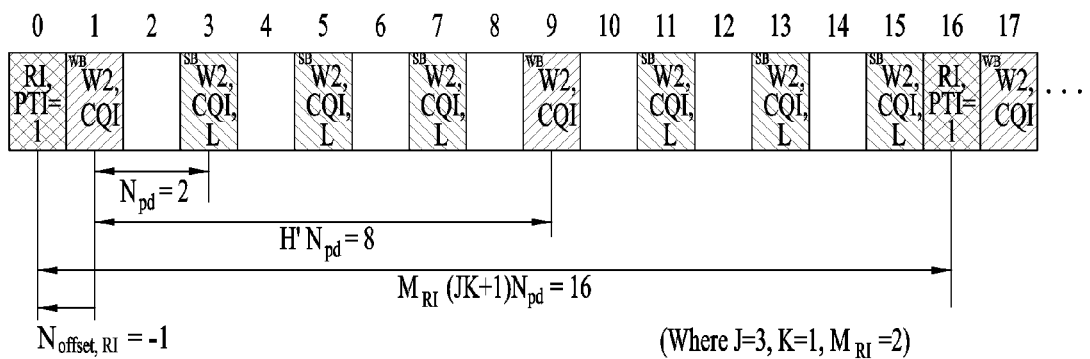

Subsequently, the PUCCH feedback mode 2-1 may be classified into two schemes according to the PTI value when the dual codebook structure is used. FIG. 16 is a conceptual diagram illustrating the PUCCH feedback mode 2-1 based on the PTI value. In the PUCCH feedback resource having the offset 1 and the period 2, the wideband W1 may be composed of the period of 8 subframes, and the wideband W2 and CQI may appear in the remaining parts. RI and PTI may be composed of the period 16 and the offset 0. If PTI is set to 1, L-bit information indicating the subband W1, the subband CQI, and the subband index may be reported as shown in FIG. 16.

In the 8Tx codebook, when L-bit information indicating the subband W2, the subband CQI, and the subband index is reported, W2 may be subsampled as shown in the following Table 5. Through the above-mentioned subsampling scheme, information can be transmitted within 11 bits indicating the payload size of the PUCCH format 2.

TABLE 5

| | Relationship between the second PMI value and codebook index $i_2$ | |
|---|---|---|
| RI | Value of the second PMI $I_{PMI\ 2}$ | Codebook index $i_2$ |
| 1 | 0-15 | $I_{PMI\ 2}$ |
| 2 | 0-3 | $2I_{PMI\ 2}$ |
| 3 | 0-3 | $8 \cdot \lfloor I_{PMI\ 2}/2 \rfloor + (I_{PMI\ 2} \bmod 2) + 2$ |
| 4 | 0-3 | $2I_{PMI\ 2}$ |
| 5 | 0 | 0 |
| 6 | 0 | 0 |
| 7 | 0 | 0 |
| 8 | 0 | 0 |

In LTE-A Rel-12, if the 4Tx dual codebook for Rank 1 or 2 is introduced, and if the legacy Rel-8 4Tx codebook is used for Rank 3 or 4, W2 must be subsampled in a similar way to the 8Tx case in such a manner that the payload size of the PUCCH format 2 is not exceeded. CQI is 7 bits long and L is 2 bits long at Rank 3 or 4, such that W2 composed of 2 bits may be subsampled as follows. That is, the subsampling operation may be applied to Rank 3 or 4 in the same manner as in one of the following Tables 6 to 8.

TABLE 6

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {0, 2, 8, 10} |
| 4 | {0, 2, 8, 10} |

TABLE 7

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {1, 3, 9, 11} |
| 4 | {1, 3, 9, 11} |

TABLE 8

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {4, 5, 6, 7} |
| 4 | {4, 5, 6, 7} |

One of Tables 6 to 8 may be established according to the subsampling scheme for Rank 3 or 4. That is, the 2-bit codebook subsampled from the Rel-8 codebook according to the above-mentioned codebook subsampling principle may be equally applied to the PUCCH feedback mode 2-1.

In Mode 2-1, W1 for Rank 3 or 4 may not be transmitted. That is, in Rank 3 or 4, only W1 may be present as a PMI. In Tables 6 to 8, "To Be Determined" of Rank 2 may be determined to be {0, 2, 4, 6, 8, 10, 12, 14} in the same manner as in the 8Tx case. In this case, n may be set to 23.

Fourth Embodiment

The fourth embodiment relates to the codebook subsampling scheme when a new codebook having the dual codebook structure of W1 and W2 is used for Rank 1 or 2.

The codebook W1 for Rank 1 or 2 may be established as follows.

$$W_1 = \begin{bmatrix} X_n & 0 \\ 0 & X_n \end{bmatrix}, n = 0, 1, \ldots, 15 \quad \text{[Equation 48]}$$

$$X_n = \begin{bmatrix} 1 & 1 & 1 & 1 \\ q_1^{(n)\bmod 16} & q_1^{(n+1)\bmod 16} & q_1^{(n+2)\bmod 16} & q_1^{(n+3)\bmod 16} \end{bmatrix}$$

$$q_1 = \exp(j2\pi/16)$$

Subsequently, the codebook W2 for Rank 2 or 2 may be established as follows.

$$W_2 \in C_2 = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\} \quad \text{[Equation 49]}$$

$$Y \in \{\tilde{e}_1, \tilde{e}_2, \tilde{e}_3, \tilde{e}_4\}$$

In Equation 49, $\tilde{e}_n$ is a (4×1) selection vector with all zeros except for the n-th element with the value of 1.

That is, 'C2 for Rank 1' may be composed of 16 vectors as follows. The codeword indexes may satisfy the order of the following equations without change. That is, as can be seen from the following equation 50, a first vector is set to "index 0", and this indexing operation may be achieved in ascending numerical order.

$$C_2 = \left\{ \begin{array}{l} \begin{bmatrix} \tilde{e}_1 \\ \tilde{e}_1 \end{bmatrix}, \begin{bmatrix} \tilde{e}_1 \\ j\tilde{e}_1 \end{bmatrix}, \begin{bmatrix} \tilde{e}_1 \\ -\tilde{e}_1 \end{bmatrix}, \begin{bmatrix} \tilde{e}_1 \\ -j\tilde{e}_1 \end{bmatrix}, \begin{bmatrix} \tilde{e}_2 \\ \tilde{e}_2 \end{bmatrix}, \\ \begin{bmatrix} \tilde{e}_2 \\ j\tilde{e}_2 \end{bmatrix}, \begin{bmatrix} \tilde{e}_2 \\ -\tilde{e}_2 \end{bmatrix}, \begin{bmatrix} \tilde{e}_2 \\ -j\tilde{e}_2 \end{bmatrix}, \begin{bmatrix} \tilde{e}_3 \\ \tilde{e}_3 \end{bmatrix}, \begin{bmatrix} \tilde{e}_3 \\ j\tilde{e}_3 \end{bmatrix}, \begin{bmatrix} \tilde{e}_3 \\ -\tilde{e}_3 \end{bmatrix}, \\ \begin{bmatrix} \tilde{e}_3 \\ -j\tilde{e}_3 \end{bmatrix}, \begin{bmatrix} \tilde{e}_4 \\ \tilde{e}_4 \end{bmatrix}, \begin{bmatrix} \tilde{e}_4 \\ j\tilde{e}_4 \end{bmatrix}, \begin{bmatrix} \tilde{e}_4 \\ -\tilde{e}_4 \end{bmatrix}, \begin{bmatrix} \tilde{e}_4 \\ -j\tilde{e}_4 \end{bmatrix} \end{array} \right\} \quad \text{[Equation 50]}$$

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

$(Y_1, Y_2) \in \{(\tilde{e}_1, \tilde{e}_1), (\tilde{e}_2, \tilde{e}_2), (\tilde{e}_3, \tilde{e}_3),$
$(\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ That is, 'C2 for Rank 2' may be composed of 16 vectors as follows. The codeword indexes may satisfy the order of the following equations without change. That is, as can be seen from the following table, a first vector is set to "index 0", and this indexing operation may be achieved in ascending numerical order.

TABLE 9

| W2 index of Rank 2 | |
| --- | --- |
| 0 | $\begin{bmatrix} \tilde{e}_1 & \tilde{e}_1 \\ \tilde{e}_1 & -\tilde{e}_1 \end{bmatrix}$ |
| 1 | $\begin{bmatrix} \tilde{e}_1 & \tilde{e}_1 \\ j\tilde{e}_1 & -j\tilde{e}_1 \end{bmatrix}$ |
| 2 | $\begin{bmatrix} \tilde{e}_2 & \tilde{e}_2 \\ \tilde{e}_2 & -\tilde{e}_2 \end{bmatrix}$ |
| 3 | $\begin{bmatrix} \tilde{e}_2 & \tilde{e}_2 \\ j\tilde{e}_2 & -j\tilde{e}_2 \end{bmatrix}$ |
| 4 | $\begin{bmatrix} \tilde{e}_3 & \tilde{e}_3 \\ \tilde{e}_3 & -\tilde{e}_3 \end{bmatrix}$ |
| 5 | $\begin{bmatrix} \tilde{e}_3 & \tilde{e}_3 \\ j\tilde{e}_3 & -j\tilde{e}_3 \end{bmatrix}$ |
| 6 | $\begin{bmatrix} \tilde{e}_4 & \tilde{e}_4 \\ \tilde{e}_4 & -\tilde{e}_4 \end{bmatrix}$ |
| 7 | $\begin{bmatrix} \tilde{e}_4 & \tilde{e}_4 \\ j\tilde{e}_4 & -j\tilde{e}_4 \end{bmatrix}$ |
| 8 | $\begin{bmatrix} \tilde{e}_1 & \tilde{e}_2 \\ \tilde{e}_1 & -\tilde{e}_2 \end{bmatrix}$ |
| 9 | $\begin{bmatrix} \tilde{e}_1 & \tilde{e}_2 \\ j\tilde{e}_1 & -j\tilde{e}_2 \end{bmatrix}$ |
| 10 | $\begin{bmatrix} \tilde{e}_2 & \tilde{e}_3 \\ \tilde{e}_2 & -\tilde{e}_3 \end{bmatrix}$ |
| 11 | $\begin{bmatrix} \tilde{e}_2 & \tilde{e}_3 \\ j\tilde{e}_2 & -j\tilde{e}_3 \end{bmatrix}$ |
| 12 | $\begin{bmatrix} \tilde{e}_1 & \tilde{e}_4 \\ \tilde{e}_1 & -\tilde{e}_4 \end{bmatrix}$ |
| 13 | $\begin{bmatrix} \tilde{e}_1 & \tilde{e}_4 \\ j\tilde{e}_1 & -j\tilde{e}_4 \end{bmatrix}$ |
| 14 | $\begin{bmatrix} \tilde{e}_2 & \tilde{e}_4 \\ \tilde{e}_2 & -\tilde{e}_4 \end{bmatrix}$ |
| 15 | $\begin{bmatrix} \tilde{e}_2 & \tilde{e}_4 \\ j\tilde{e}_2 & -j\tilde{e}_4 \end{bmatrix}$ |

Figure 17:
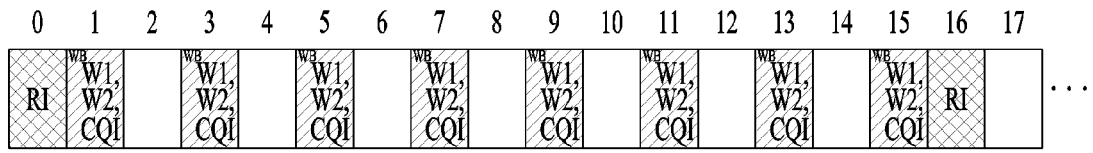
FIG. 17 is a conceptual diagram illustrating a submode B when a new codebook is used.

In PUCCH feedback mode 1-1, when the dual codebook structure is used, the submodes A and B may be used. FIG. 17 is a conceptual diagram illustrating the submode B when the new codebook is used.

Referring to FIG. 17, the wideband W1/W2 and the wideband may be composed of the offset 1 and the period 2. RI and W1 may be composed of the offset 0 and the period 16.

In the 8Tx codebook, W1 and W2 may be subsampled as shown in the following table 10, such that the wideband W1/W2 and the wideband CQI can be reported.

TABLE 10

| | PMI for W1 | | PMI for W2 | | total |
| --- | --- | --- | --- | --- | --- |
| RI | #bits | values | #bits | values | #bits |
| 1 | 3 | {0, 2, 4, 6, 8, 10, 12, 14} | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | {0} | 0 | {0} | 0 |

8Tx W1 of Rank 1 or 2 may be defined as shown in the following equation. That is, the i-th PMI and the (i+1)-th PMI may share two overlapping DFT vectors. Likewise, two DFT vectors may overlap between the contiguous PMIs, such that the channel can be more accurately fed back. However, PMI of the even-th W1 is limited to an even-th order in consideration of the limited PUCCH resources, such that subsampling may be performed. Although the overlapping DFT vectors are not present between the even-th PMIs, the UE can represent all 32 DFT vectors using W1, such that performance deterioration can be minimized $$B = [\, b_0 \quad b_1 \quad \ldots \quad b_{31}\,], \ [B]_{1+m,1+n} = e^{j\frac{2\pi mn}{32}},$$ [Equation 50]

$$m = 0, 1, 2, 3, n = 0, 1, \ldots, 31$$

$$X^{(k)} \in$$

$$\{[\, b_{2k \bmod 32} \quad b_{(2k+1) \bmod 32} \quad b_{(2k+2) \bmod 32} \quad b_{(2k+3) \bmod 32}\,]: k = 0,$$

$$1, \ldots, 15\}$$

$$W_1^{(k)} = \begin{bmatrix} X^{(k)} & 0 \\ 0 & X^{(k)} \end{bmatrix}$$

$$C_1 = \{W_1^{(0)}, W_1^{(1)}, W_1^{(2)}, \ldots, W_1^{(15)}\} \quad \text{Codebook1:}$$

Similar to the above-mentioned 8Tx codebook subsampling method, subsampling is needed for the new 4Tx codebook, and the subsampling operation may be performed for Rank 1 or 2 as shown in the following Table.

TABLE 11

| RI | PMI for W1 | | PMI for W2 | | total |
|---|---|---|---|---|---|
| | #bits | values | #bits | values | #bits |
| 1 | 2 | {0, 4, 8, 12} | 2 | {0, 2, k1, k2} | 4 |
| 2 | 2 | {0, 4, 8, 12} | 2 | {k3, k4, k5, k6} | 4 |

First, W1 subsampling of the 4Tx codebook will hereinafter be described.

W1 subsampling of the 4Tx codebook may be performed in a similar way to W1 subsampling of the 8Tx codebook. In Table 11, W1 may allow the i-th PMI and the (i+1)-th PMI to share three overlapping DFT vectors. In addition, the i-th PMI and the (i+2)-th PMI may share two overlapping DFT vectors, and the i-th PMI and the (i+3)-th PMI may share one overlapping DFT vector.

That is, excepting the overlap PMI in consideration of the limited PUCCH resources, PMI of W1 may be subsampled into {0, 4, 8, 12}. Although the overlapping DFT vector is not present between the subsampled PMIs, the UE can represent 16 DFT vectors using W1, such that performance deterioration can be minimized.

W2 subsampling of the 4Tx codebook at Rank 1 will hereinafter be described.

W2 subsampling of the 4Tx codebook at Rank 1 may be implemented in various ways according to configuration of the indexes (k1, k2, k3, k4, k5, k6).

In Rank 1, a first vector from among DFT vectors of W1 is selected using W2 PMI (0, 2), and phase shift between the polarized antenna groups may be denoted by +1 or −1. In addition, granularity of the phase shift may be increased using k1 and k2, or the vector selector of W1 may be established.

If k1 and k2 are respectively set to 1 and 3 so as to increase the granularity of phase shift, the phase shift value may be denoted by {1, −1, −j, j} at Rank 1.

If k1 is set to 8 and k2 is set to 10 so as to establish the vector selector, phase shift at Rank 1 may be denoted by 1 or −1, and a first vector or a third vector from among the DFT vectors of W1 may be selected.

Alternatively, if k1 is set to 4 and k2 is set to 4 so as to establish the vector selector, phase shift at Rank 1 may be denoted by 1 or −1, and a first vector or a second vector from among the DFT vectors of W1 may be selected. If (k1, k2) is set to (4, 6), two DFT vectors having higher correlation as compared to the method for establishing (8, 10) can be selected. That is, if the channel is slowly changed in a time or frequency domain, feedback accuracy may be improved by setting (4, 6).

W2 subsampling of the 4Tx codebook at Rank 2 will hereinafter be described in detail.

k3 is set to 0 and k4 is set to 1 in such a manner that the 8Tx codebook subsampling is included, and the following values for k5 and k6 may be used.

A first vector from among the DFT vectors of W1 may be selected using W2 PMI (0, 1) at Rank 2, and the phase shift between the polarized antenna groups may be denoted by '1' in association with the first layer, and may be denoted by '−1' in association with the second layer. The phase shift between the polarized antenna groups may be denoted by T in association with the first layer, and may be denoted by '−j' in association with the second layer. The vector selector of W1 may be established using k5 and k6.

If k5 is set to 4 and k6 is set to 5 so as to establish the vector selector, phase shift at Rank 2 may be denoted by (1, −1) or (j, −j), and a first vector or a third vector from among the DFT vectors of W1 may be selected.

Alternatively, if k5 is set to 2 and k6 is set to 3 so as to establish the vector selector, the phase shift at Rank 1 may be denoted by (1, −1) or (j, −j), and the first vector or the second vector from among the DFT vectors of W1 may be selected. If (k5, k6) is set to (2, 3), two DFT vectors having higher correlation as compared to the method for establishing (4, 5) can be selected. That is, if the channel is slowly changed in a time or frequency domain, feedback accuracy may be improved by setting (2, 3).

In addition, k3, k4, k5, and k6 may be respectively set to 0, 2, 4, and 6, and the phase shift values of two layers may be fixed to (1, −1), so that four selectors may be established. That is, the first, second, third, or fourth vector from among the DFT vectors of W1 may be selected under this situation.

Meanwhile, various values other than k1, k2, k3, k4, k5, and k6 shown in the above example may be used. The above values may be semi-statically established through higher layer signaling (e.g., RRC signaling) from the BS (eNB) to the UE. That is, the BS and the UE may promise various codebook subsampling schemes so as to reduce feedback overhead, such that the BS may designate only one scheme for the UE.

Fifth Embodiment

The fifth embodiment relates to the codebook subsampling method when the 4Tx codebook is used.

The CSI reporting type may be set to one of various types. For example, the CSI reporting type defined in LTE Rel-10 is as follows. Type 1 report may support CQI feedback for the UE selected sub-bands. Type 1a report may support the subband CQI and the second PMI feedback. Type 2 report, Type 2b report, and Type 2c report may support the wideband CQI and the PMI feedback. Type 2a report may support the wideband PMI feedback. Type 3 report may support the RI feedback. Type 4 report may support the wideband CQI. Type 5 report may support the RI and wideband PMI feedback. Type 6 report may support the RI and PTI feedback.

The W2 subsampling method when the 4Tx codebook is used will hereinafter be described in detail.

The following subsampling scheme can be applied to Type 5 report and Type 2c report at the submodes A and B of the PUCCH feedback mode 1-1. The proposed codebook W1 may establish the codewords (n=0, 1, . . . , 7) to guarantee high performance in the correlated channel environment, such that dense DFT vectors may construct one W1. In addition, in order to guarantee high performance in the uncorrelated channel environment, the codewords (n=8, 9, . . . , 15) may be established so that fewer DFT vectors can construct only one W1.

The 4Tx codebook may be denoted by multiplication of two matrices as shown in the following equation 51.

$$W = W_1 \cdot W_2 \quad \text{[Equation 51]}$$

In Equation 51, the inner precoder $W_1$ may indicate the wideband/long-term channel characteristics, and the outer precoder $W_2$ may indicate the subband/short-term channel characteristics. $W_1$ may be established as follows.

$$W_1 = \begin{bmatrix} X_n & 0 \\ 0 & X_n \end{bmatrix}, n = 0, 1, \ldots, 15 \quad \text{[Equation 52]}$$

In Equation 52, $X_n$ may be established as follows.

$$X_n = \quad \text{[Equation 53]}$$

$$\begin{cases} \begin{bmatrix} 1 & 1 & 1 & 1 \\ q_1^{2n} & q_1^{2n+1} & q_1^{2n+2} & q_1^{2n+3} \end{bmatrix} & n = 0, 1, \ldots, 7 \\ \begin{bmatrix} 1 & 1 & 1 & 1 \\ q_1^{2(n-8)} & q_1^{2(n-8)+2} & q_1^{2(n-8)+4} & q_1^{2(n-8)+6} \end{bmatrix} & n = 8, 9, \ldots, 15 \end{cases}$$

$$q_1 = e^{2\pi j/16}$$

The codebook $W_2$ for Rank 1 may be established as follows.

$$W_2 \in C_2 = \left\{ \begin{bmatrix} Y_1 \\ q_2^{m_{r2}} Y_2 \end{bmatrix} \right\}, q_2 = e^{2\pi j/8} \quad \text{[Equation 54]}$$

$$(Y_1, Y_2) \in \begin{cases} \{(e_1, e_1), (e_3, e_4)\} & m_{r2} = 0, 2, 4, 6 \\ \{(e_2, e_2), (e_4, e_4)\} & m_{r2} = 1, 3, 5, 7 \end{cases}$$

In addition, the codebook $W_2$ for Rank 2 may be established as follows.

$$W_2 \in C_2 = \left\{ \begin{bmatrix} Y_1 & Y_2 \\ q_2^{m_{r2}} Y_1 & -q_2^{m_{r2}} Y_2 \end{bmatrix} \right\}, q_2 = e^{2\pi j/8} \quad \text{[Equation 54]}$$

$$(Y_1, Y_2) \in \{(e_1, e_1), (e_2, e_2), (e_3, e_3), (e_4, e_4),$$
$$(e_1, e_3), (e_2, e_4), (e_1, e_4), (e_2, e_3)\}, m_{r2} = 0, 2$$

In Equation 54, $e_n$ may denote the 4-element selection vector with all zeros except the n-th element which is set to the value of 1.

W1 subsampling may be efficiently performed by reflecting W1 characteristics. That is, when 4-bit W1 is subsampled into 2-bit W1, the codewords (n=0, 1, . . . , 7) may be subsampled to guarantee high performance in a highly correlated channel environment. In future, BSs (eNBs) and UEs are gradually miniaturized in size and the number of antennas is increased, and a distance between the antennas is shortened, so that the correlated channel may be formed at a higher probability. Therefore, the operation for subsampling the codewords (n=0, 1, . . . , 7) may be considered effective.

Alternatively, when the 4-bit W1 is subsampled into the 2-bit W1, the codewords (n=8, 9, . . . , 15) may be subsampled to guarantee higher performance under the uncorrelated channel environment. If a specific communication enterprise installs the eNBs (or BSs) in which antennas are spaced apart from one another by a long distance, the subsampling scheme is considered beneficial.

Alternatively, when the 4-bit W1 is subsampled into the 2-bit W1, some codewords from among (n=0, 1, . . . , 7) and some codewords from among (n=8, 9, . . . , 15) may be subsampled to guarantee a higher performance not only in the uncorrelated channel environment but also in the correlated channel environment. For example, only the even number (n) may be subsampled to construct the codeword.

One of the above W1 subsampling schemes may be signaled from the BS to the UE. In more detail, the W1 subsampling scheme may be designated using information added to the CSI process configuration. In addition, assuming that various subsamplings for W2 are present, the corresponding information may be signaled from the BS to the UE.

Sixth Embodiment

In LTE Rel-12, the new codebook having a dual codebook structure may be introduced to improve performance at Rank 1 or 2 of the 4Tx codebook, and the legacy Rel-8 codebook at Rank 3 or 4 may be used.

Figure 18:
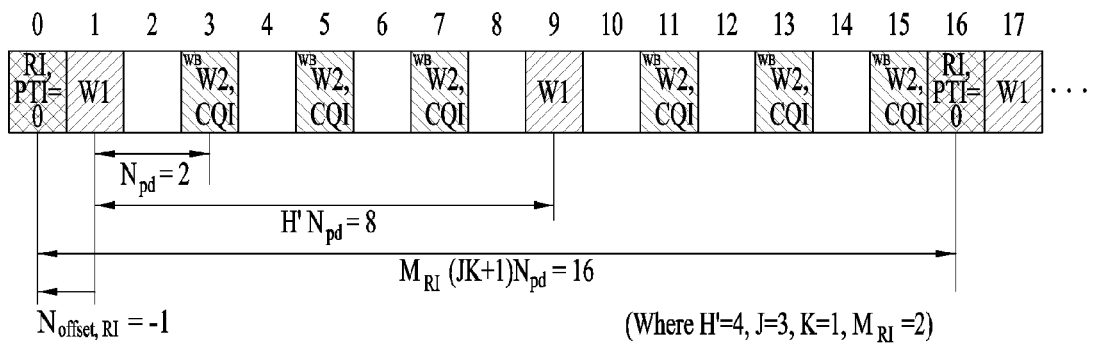
FIG. 18 is a conceptual diagram illustrating a PUCCH feedback mode 2-1 based on a PTI value.
Figure 18:
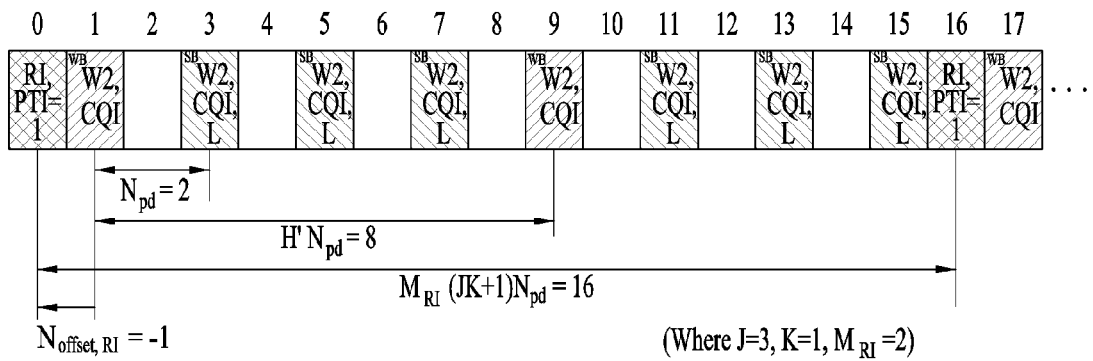

In Rank 1 or 2 of the 4Tx codebook, a dual codebook structure in which PMI information is composed of W1 and W2, such that the PUCCH feedback mode 2-1 for 8Tx codebook may be used without change. FIG. 18 is a conceptual diagram illustrating the PUCCH feedback mode 2-1 based on the PTI value. Referring to FIG. 18, in the PUCCH feedback resource having the offset 1 and the period 2, the wideband W1 may appear at intervals of 8 subframes, and the wideband W1 and CQI may appear in the remaining parts. RI and PTI may be configured at the period 16 and the offset 0. If PTI is set to 1, L-bit information indicating the subband W1, the subband CQI, and the subband index may be reported as shown in FIG. 16.

However, in Rank 3 or 4 of the 4Tx codebook, PMI information may be configured in the form of a single matrix codebook structure of W, instead of the dual codebook structure composed of W1 and W2. Therefore, it may be difficult to use the PUCCH feedback mode 2-1 (shown in FIG. 18) supporting the dual codebook without change. For example, in Rank 3 or 4, the PTI value is unnecessary.

In order to support the PUCCH feedback mode 2-1 for Rank 3 or 4 in the 4Tx codebook, two feedback schemes are proposed.

The first feedback scheme is designed to change the feedback framework of the feedback mode 2-1 according to the rank.

Figure 19:
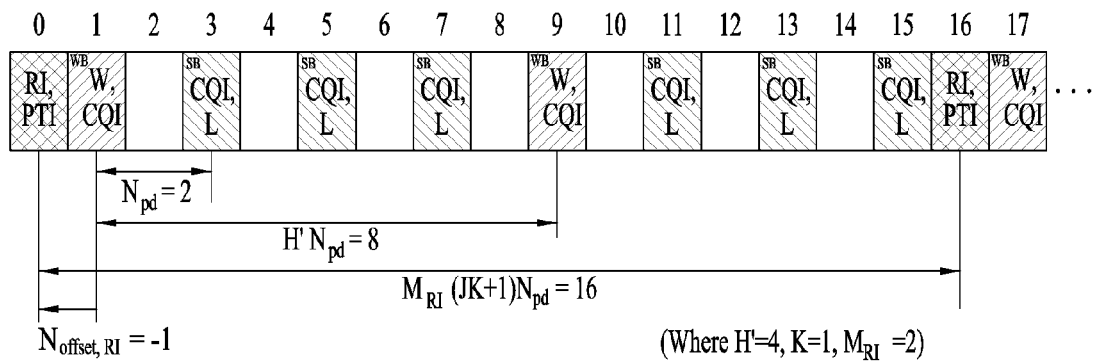
FIG. 19 is a conceptual diagram illustrating a PUCCH feedback mode 2-1 at Ranks 3 and 4.

In accordance with the first feedback scheme, the PUCCH feedback mode 2-1 at Rank 1 or 2 may use the legacy scheme as shown in FIG. 18, and the PUCCH feedback mode 2-1 at Rank 3 or 4 may be configured as shown in FIG. 19. Referring to FIG. 19, in the PUCCH feedback resource having the offset 1 and the period 1, the PMI information W and the wideband CQI may appear at intervals of 8 subframes, and L-bit information indicating the subband CQI and the subband index may appear in the remaining parts. RI and PTI may be configured at the period 16 and the offset 0. That is, the feedback framework of the feedback mode 2-1 may be changed according to the rank.

If the UE decides the PTI value and feeds back the decided PTI value at Rank 1 or 2, the BS (or eNB) may interpret the resultant PTI value as an effective value, and may decide the type according to the interpreted result. In contrast, in Rank 3 or 4, the UE may decide "PTI=0" or "PTI=1", and may feed back the decided PTI value. If RI of the BS indicates Rank 3 or Rank 4, the PTI value is not interpreted and then discarded. Alternatively, the UE may always fix "PTI=1" and feed back "PTI=1", and the BS may recognize the feedback value "PTI=1". Similarly, the UE may always fix "PTI=0" and may feed back "PTI=0", such that the BS may also recognize the fixed value "PTI=0".

If RI re-indicates Rank 1 or 2, the UE may decide the PTI value and feed back the decided PTI value. The BS may interpret the resultant PTI value without negligence, and then decide the corresponding type.

The second feedback scheme may limit the PTI value capable of being selected according to the rank.

Figure 20:
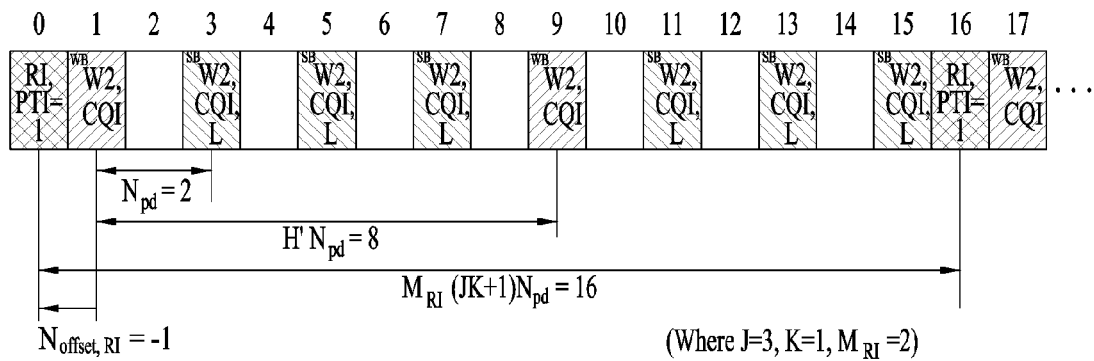
FIG. 20 is a conceptual diagram illustrating a PUCCH feedback mode 2-1 at Ranks 3 and 4.

In accordance with the second feedback scheme, the PUCCH feedback mode 2-1 may be established as shown in FIG. 20. Referring to FIG. 20, in the PUCCH feedback resource having the offset 1 and the period 2, the wideband W and the wideband CQI may appear at intervals of 8 subframes. L-bit information indicating the subband W, the subband CQI, and the subband index may appear in the remaining parts. RI and PTI may be configured at the period 16 and the offset 0.

When the L-bit information indicating the subband W, the subband CQI, and the subband index is reported, W2 must be subsampled in a similar way to the 8Tx case in a manner that the payload size of the PUCCH format 2 is not exceeded. In Rank 3 or 4, CQI is 7 bits long and L is 2 bits long, such that 2-bit subsampling of W2 at Rank 3 or 4 may be performed in the same manner as in Tables 12 to 14.

TABLE 12

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {0, 2, 8, 10} |
| 4 | {0, 2, 8, 10} |

TABLE 13

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {1, 3, 9, 11} |
| 4 | {1, 3, 9, 11} |

TABLE 14

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {4, 5, 6, 7} |
| 4 | {4, 5, 6, 7} |

One of Tables 12 to 14 may be established using the 2-bit subsampling scheme of W2.

W1 of the UE and the BS may be promised as the identity matrix, the UE may select W2 from the single codebook of Rank 3 or 4 and may perform signaling of the selected W2.

In Rank 1 or 2, if the UE sets the PTI value to 0 or 1 in the same manner as in the conventional art and feeds back the PTI value, the BS may interpret the feedback PTI value as an effective value and then decide the corresponding type. In contrast, in Rank 3 or 4, the UE may always set the PTI value to the value of 1 and then feed back the resultant PTI value. If RI re-designates Rank 1 or 2, the UE may set the PTI value to 0 or 1 and may feed back the decided PTI value, and the BS may interpret the resultant PTI value and decide the type.

Figure 21:
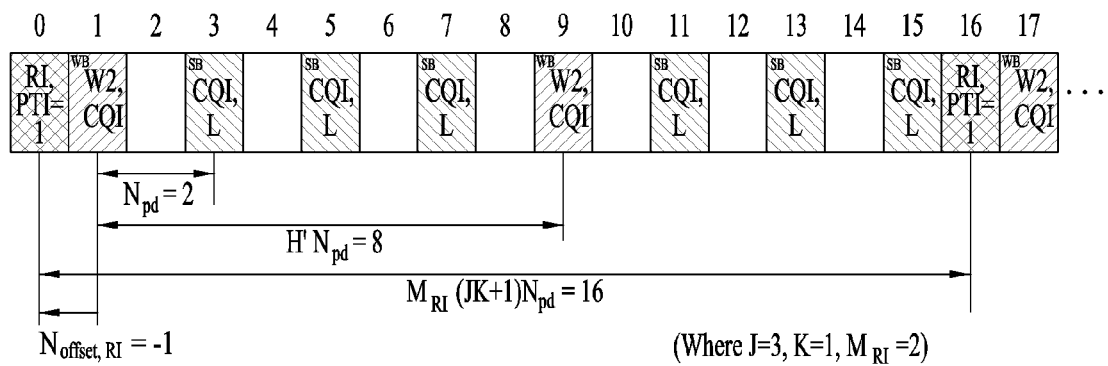
FIG. 21 is a conceptual diagram illustrating a PUCCH feedback mode 2-1 at Ranks 3 and 4.

In brief, the second feedback scheme has disclosed the scheme for limiting the PTI value capable of being selected according to the rank. That is, if Rank is set to 3 or 4, PTI may be fixed to the value of 1. In addition, SB W2 may be omitted to increase the decoding probability of the subband (SB) CQI transmission at Rank 3 or 4. For example, the setting or configuration may be achieved at Rank 3 or 4 as shown in FIG. 21. WB CQI and W2 may be transmitted at intervals of a predetermined period '(JK+1)Npd', and SB information may be used to transmit only CQI other than PMI. Of course, W2 may indicate PMI information of Rank 3 or 4. After the BS receives W2, it is assumed that W1 is set to an identity matrix, such that W=W1*W2 is calculated. Differently from the feedback method of FIG. 19, WB PMI/CQI information according to the feedback method of FIG. 21. may be transmitted at intervals of a predetermined time '(JK+1)Npd'.

Seventh Embodiment

In LTE Rel-8 codebook, the precoding matrix for transmission of 4-antenna ports may be determined using the following Table 15. In Table 15, $W_n^{\{s\}}$ may be determined according to $W_n = I - 2u_n u_n^H / u_n^H u_n$. I is the (4×4) identity matrix, and the vector $(u_n)$ is shown in the following Table 15.

TABLE 15

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |

TABLE 15-continued

| Codebook index | $u_n$ | Number of layers v | | | |
|---|---|---|---|---|---|
| | | 1 | 2 | 3 | 4 |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Equations 40 to 46 may be implemented by enumerating the matrices generated through the above equation ($W_n = I - 2u_n u_n^H / u_n^H u_n$), and the Rank-3 codebook may be configured by selecting a specific column from the above equation $W_n$ as shown in Table 15.

In Rank 3 or 4 of PUCCH mode 2-1, in the case of the Type 1a report in which W1 and the subband CQI are transmitted, the codebook of Rank 3 or 4 needs to be limited to 2 bits. In Rank 3 or 4, CQI is 7 bits long and L is 2 bits long, such that 2-bit subsampling of W2 at Rank 3 or 4 is needed.

In order to design the codebook having superior performance, it is necessary to consider or use a chordal distance between the codewords. It may be preferable that the subsampling be performed in consideration of the chordal distance between the subsampled codewords. The following equation 55 may indicate the chordal distance between the matrix A and the other matrix B.

$$d(A, B) = \frac{\|AA^H - BB^H\|_F}{\sqrt{2}}$$ [Equation 55]

In Equation 55, $A^H$ is a conjugate transpose of the matrix A, and $\|A\|_F$ is the Frobenius norm of the matrix A.

The final subsampled codebook may be determined in consideration of the chordal distance as shown in the following equation 56.

$$(j_1, j_2, j_3, j_4) = \underset{i_1,i_2,i_3,i_4 \in \{0,1,2,\ldots 15\}, i_1 \neq i_2 \neq i_3 \neq i_4}{\operatorname{argmax}}$$
$$\min(\{d(W_{i_1}, W_{i_2}), d(W_{i_1}, W_{i_3}), d(W_{i_1}, W_{i_4}),$$
$$d(W_{i_2}, W_{i_3}), d(W_{i_2}, W_{i_4}), d(W_{i_3}, W_{i_4})\})$$ [Equation 56]

In Equation 56, $i_1, i_2, i_3, i_4$ acting as the codeword indexes may be integers from 0 to 15, and d(A, B) may indicate the chordal distance between A and B. $W_{i1}, W_{i2}, W_{i3}$, and $W_{i4}$ may indicate the $i_1$-th codeword, the $i_2$-th codeword, the $i_3$-th codeword, and the $i_4$-th codeword, respectively.

In the case of calculating $j_1, j_2, j_3, j_4$ for the Rel-8 4Tx Rank-3 codeword using Equation 56, $j_1, j_2, j_3, j_4$ may respectively be 0, 2, 8, 10, may respectively be 12, 13, 14, 15, or may respectively be 1, 3, 9, 11. The minimum chordal distance of the $0^{th}$, $28^{th}$, or 10th Rank-3 codeword is set to 1. The minimum chordal distance of the 12-th, 13-th, 14-th, or 15-th Rank-3 codeword is set to 1. The minimum chordal distance of the $1^{st}$, $3^{rd}$, $9^{th}$, or $11^{th}$ Rank-3 codeword is set to 1. Therefore, as shown in Table 12, Table 13, or Table 16 in association with Rank 3, subsampling is considered effective in terms of the chordal distance.

TABLE 16

| RI | W2 values |
|---|---|
| 1 | {0, 1, 2, 3, 4, 5, 6, 7, 8, 9, 10, 11, 12, 13, 14, 15} |
| 2 | To Be Determined |
| 3 | {12, 13, 14, 15} |
| 4 | {12, 13, 14, 15} |

In association with the Rel-8 4Tx Rank-4 codewords ($i_1, i_2, i_3, L_4$), the minimum chordal distance of Equation 56 is set to zero. Therefore, the operation for performing subsampling in consideration of the chordal distance in association with Rank 4 is meaningless. Subsampling of Rank-4 codeword is achieved in the full rank environment, such that subsampling optimization does not cause the critical factor to performance. Therefore, in order to simplify the implementation, as shown in Table 12, Table 13, or Table 16, Rank-4 subsampling may be performed using the same scheme as in the Rank-3 subsampling.

In this case, in order to reduce implementation complexity, if the codebook subsampling composed of only real numbers is performed, subsampling may be effectively performed as shown in Table 12.

If the subsampling is performed as shown in Table 13, each element constructing the PMI matrix is classified into a real number and an imaginary number, such that implementation complexity can be greatly reduced as compared to the PMI matrix having complex element values in which a real number and an imaginary number are mixed.

In the closely spaced antenna configuration in which antennas are spaced apart from each other by an equal distance corresponding to a half wavelength, it is well known to those skilled in the art that a method for constructing the PMI using the DFT matrix having linear phase increment (LPI) attributes is beneficial to superior performance. However, in the case of using the widely spaced antenna, LPI characteristics cannot guarantee PMI performance. Therefore, in order to improve performance of the widely spaced antenna or the uncorrelated channel, the codebook may be composed of codewords having no LP characteristics as shown in Table 16.

In accordance with the method for transmitting channel state information (CSI), various embodiments of the present invention are performed independently or two or more embodiments of the present invention are performed simultaneously. Redundant matters will not be described herein for clarity.

In addition, the principles of the present invention may also be applied to UL MIMO transmission and reception according to the present invention in association with not only MIMO transmission between the base station (BS) and the relay node (RN) (for use in a backhaul uplink and a backhaul downlink) but also MIMO transmission between the RN and the UE (for use in an access uplink and an access downlink).

BS and UE Applicable to the Embodiments of the Present Invention

Figure 22:
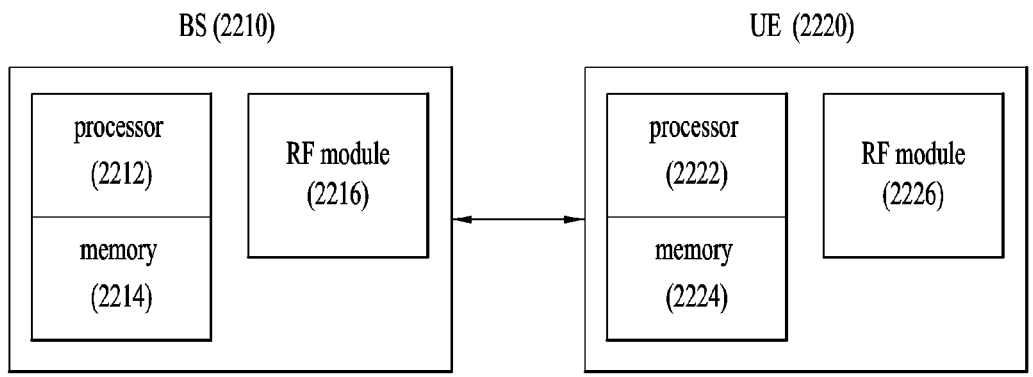
FIG. 22 is a block diagram illustrating a base station (BS) and a user equipment (UE) applicable to the embodiments of the present invention.

FIG. 22 illustrates a BS and a UE which are applicable to the present invention.

If a wireless communication system includes a relay, communication in a backhaul link is performed between the BS and the relay and communication in an access link is performed between the relay and the UE. Accordingly, the BS and UE shown in FIG. 22 may be replaced with the relay according to situation.

Referring to FIG. 22, a wireless communication system includes a BS 2210 and a UE 2220. The BS 2210 includes a processor 2212, a memory 2214, and a Radio Frequency (RF) unit 2216. The processor 2212 may be configured so as to implement the procedures and/or methods proposed in the present invention. The memory 2214 is connected to the processor 2212 and stores various pieces of information related to operations of the processor 2212. The RF unit 2216 is connected to the processor 2212 and transmits and/or receives RF signals. The UE 2220 includes a processor 2222, a memory 2224, and an RF unit 2226. The processor 2222 may be configured so as to implement the procedures and/or methods proposed in the present invention. The memory 2224 is connected to the processor 2222 and stores various pieces of information related to operations of the processor 2222. The RF unit 2226 is connected to the processor 2222 and transmits and/or receives RF signals. The BS 2210 and/or the UE 2220 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor.

The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention can be applied to wireless communication devices, such as a user equipment (UE), a relay, a base station (BS), etc.

What is claimed is:

1. A method for generating channel state information (CSI) by a user equipment (UE) in a wireless communication system, the method comprising:
    generating the channel state information (CSI) by measuring channel state;
    subsampling a codebook for 4-antenna ports including 16 precoding matrices; and
    feeding back the generated channel state information (CSI) based on the subsampled codebook,
    wherein the generated channel state information (CSI) includes at least one of a rank indicator (RI), a precoding matrix indicator (PMI), or a channel quality indicator (CQI),
    wherein if the RI is set to 1 or 2, the CSI includes one of two kinds of PMIs,
    wherein if the RI is set to 3 or 4, the CSI includes only the CQI when the CSI is a subband CSI, and the CSI includes a single kind of PMI when the CSI is a wideband CSI,
    wherein, if the RI is set to 3, the subsampled codebook is determined in a manner that a minimum chordal distance between subsampled codewords is maximized, phases of the subsampled codewords increase in proportion to codeword indexes when the 4 antenna ports are spaced apart from each other by an equal distance corresponding to a half wavelength, and the phases of the subsampled codewords are out of proportion to the codeword indexes when the 4 antenna ports are spaced apart from each other larger than the half wavelength, and
    wherein, if the RI is set to 4, the subsampled codebook is determined to be the same as the determined subsampled codebook with the RI set to 3.

2. The method according to claim 1, wherein the subsampled codebook includes a first precoding matrix, a third precoding matrix, a 9th precoding matrix, and a 11st precoding matrix from among the 16 precoding matrices.

3. The method according to claim 1, wherein the subsampled codebook includes a 13rd precoding matrix, a 14th precoding matrix, a 15th precoding matrix, and a 16th precoding matrix from among the 16 precoding matrices.

4. The method according to claim 1, wherein the subsampled codebook includes a second precoding matrix, a fourth precoding matrix, a 10th precoding matrix, and a 12th precoding matrix from among the 16 precoding matrices.

5. The method according to claim 1, wherein the subsampled codebook includes only real numbers.

6. A user equipment (UE) for generating channel state information (CSI) in a wireless communication system, the UE comprising:
   a radio frequency (RF) unit; and
   a processor,
   wherein the processor is configured to:
      generate the channel state information (CSI) by measuring channel state,
      sample a codebook for 4-antenna ports including 16 precoding matrices, and
      feed back the generated channel state information (CSI) based on the subsampled codebook,
   wherein the generated channel state information (CSI) includes at least one of a rank indicator (RI), a precoding matrix indicator (PMI), or a channel quality indicator (CQI), and
   wherein if the RI is set to 1 or 2, the CSI includes one of two kinds of PMIs,
   wherein if the RI is set to 3 or 4, the CSI includes only the CQI when the CSI is a subband CSI, and the CSI includes a single kind of PMI when the CSI is a wideband CSI,
   wherein if the RI is set to 3, the subsampled codebook is determined in a manner that a minimum chordal distance between subsampled codewords is maximized, phases of the subsampled codewords increase in proportion to codeword indexes when the 4 antenna ports are spaced apart from each other by an equal distance corresponding to a half wavelength, and the phases of the subsampled codewords are out of proportion to the codeword indexes when the 4 antenna ports are spaced apart from each other larger than the half wavelength, and
   wherein, if the RI is set to 4, the subsampled codebook is determined to be the same as the determined subsampled codebook with the RI set to 3.

7. The UE according to claim 6, wherein the subsampled codebook includes a first precoding matrix, a third precoding matrix, a 9th precoding matrix, and a 11st precoding matrix from among the 16 precoding matrices.

8. The UE according to claim 6, wherein the subsampled codebook includes a 13rd precoding matrix, a 14th precoding matrix, a 15th precoding matrix, and a 16th precoding matrix from among the 16 precoding matrices.

9. The UE according to claim 6, wherein the subsampled codebook includes a second precoding matrix, a fourth precoding matrix, a 10th precoding matrix, and a 12th precoding matrix from among the 16 precoding matrices.

10. The UE according to claim 6, wherein the subsampled codebook includes only real numbers.

* * * * *